United States Patent
Yamamoto

(10) Patent No.: US 10,075,366 B2
(45) Date of Patent: Sep. 11, 2018

(54) COMMUNICATION DEVICE, COMMUNICATION SYSTEM, COMMUNICATION CONTROL METHOD, AND COMMUNICATION CONTROL PROGRAM

(71) Applicant: SUMITOMO ELECTRIC INDUSTRIES, LTD., Osaka-shi, Osaka (JP)

(72) Inventor: Takashi Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 73 days.

(21) Appl. No.: 14/765,358

(22) PCT Filed: Jul. 23, 2014

(86) PCT No.: PCT/JP2014/069426
§ 371 (c)(1),
(2) Date: Aug. 3, 2015

(87) PCT Pub. No.: WO2015/022845
PCT Pub. Date: Feb. 19, 2015

(65) Prior Publication Data
US 2015/0381475 A1 Dec. 31, 2015

(30) Foreign Application Priority Data
Aug. 12, 2013 (JP) .................................. 2013-167543

(51) Int. Cl.
*H04L 12/703* (2013.01)
*H04W 40/26* (2009.01)
(Continued)

(52) U.S. Cl.
CPC .............. *H04L 45/28* (2013.01); *H04L 47/12* (2013.01); *H04W 24/08* (2013.01);
(Continued)

(58) Field of Classification Search
CPC ..... H04W 84/18; H04W 40/28; H04W 40/12; H04W 40/246; H04W 40/20; H04W 40/02; H04W 40/24; H04W 84/20
See application file for complete search history.

(56) References Cited

U.S. PATENT DOCUMENTS

2006/0293061 A1* 12/2006 Kobayashi .............. H04L 45/02
455/455
2007/0153737 A1* 7/2007 Singh .................... H04W 40/18
370/331

(Continued)

FOREIGN PATENT DOCUMENTS

| JP | 2008-193543 A | 8/2008 |
| JP | 2008-199332 A | 8/2008 |

(Continued)

OTHER PUBLICATIONS

"Wikipedia", [online], searched on Jun. 28, 2013, Internet <URL:http//ja.wikipedia.org/ad hoc>, including partial English translation.
(Continued)

*Primary Examiner* — Jung Park
(74) *Attorney, Agent, or Firm* — Drinker Biddle & Reath LLP

(57) ABSTRACT

A master station 101 according to one aspect of the present invention includes: a communicating unit 10 that can communicate with a subordinate station 102 by using a communication route through one or a plurality of wireless terminal devices 202, and communicates with the subordinate station 102 in accordance with a predetermined rule; and a reconstruction processing unit 43 that performs a
(Continued)

process of changing the communication route when a state against the predetermined rule occurs. The reconstruction processing unit 43 decides whether to perform the process of changing the communication route, based on an arrival state of a communication signal destined for the own master station 101 regularly transmitted from the subordinate station 102.

9 Claims, 22 Drawing Sheets

(51) Int. Cl.
*H04L 12/801* (2013.01)
*H04W 24/08* (2009.01)
*H04W 40/24* (2009.01)
*H04W 84/20* (2009.01)
*H04W 84/18* (2009.01)
*H04W 88/02* (2009.01)

(52) U.S. Cl.
CPC ......... *H04W 40/248* (2013.01); *H04W 40/26* (2013.01); *H04W 84/18* (2013.01); *H04W 84/20* (2013.01); *H04W 88/02* (2013.01)

(56) References Cited

U.S. PATENT DOCUMENTS

| | | | |
|---|---|---|---|
| 2007/0195702 A1* | 8/2007 | Yuen | H04L 45/121 370/238 |
| 2008/0062916 A1* | 3/2008 | Mosko | H04L 45/18 370/328 |
| 2008/0186984 A1 | 8/2008 | Nakano | |
| 2008/0192724 A1 | 8/2008 | Kondo et al. | |
| 2009/0323519 A1* | 12/2009 | Pun | H04L 45/20 370/225 |
| 2013/0201891 A1* | 8/2013 | Rodriguez | H04W 40/005 370/311 |
| 2013/0250945 A1* | 9/2013 | Hui | H04W 40/023 370/389 |

FOREIGN PATENT DOCUMENTS

JP 2011-223419 A 11/2011
JP 2012-070368 A 4/2012

OTHER PUBLICATIONS

C. Perkins, et al., "Ad hoc On-Demand Distance Vector (AODV) Routing," RFC 3561, 2003.
T. Clausen, et al., "Optimized Link State Routing Protocol (OLSR)," RFC 3626, 2003.

* cited by examiner

COMMUNICATION DEVICE, COMMUNICATION SYSTEM, COMMUNICATION CONTROL METHOD, AND COMMUNICATION CONTROL PROGRAM

TECHNICAL FIELD

The present invention relates to a communication device, a communication system, a communication control method, and a communication control program. Particularly, the invention relates to a communication device, a communication system, a communication control method, and a communication control program for performing communication by using a communication route through one or a plurality of wireless terminal devices.

BACKGROUND ART

In the "Wikipedia", (online), (searched on Jun. 28, 2013, the internet <URL: http://ja.wikipedia.org/ad hoc> (Non-Patent Literature 1), there is described a wireless ad hoc network. That is, in the mobile communication used by a portable telephone and the like, infrastructure facilities such as a fixed network connecting between the wireless base station device and the wireless base station device are essential. On the other hand, in the wireless ad hoc network, each wireless terminal device autonomously performs routing, and performs multi-hop communication. The wireless ad hoc network does not require a fixed network, and is infra-less by nature. Therefore, by disseminating wireless terminal devices in the environment in which a network is desired to be constructed and by only setting a state that the wireless terminal devices gather, the network can be instantly constructed.

CITATION LIST

Non-Patent Literature

Non-Patent Literature 1: the "Wikipedia", (online), (searched on Jun. 28, 2013, the internet <URL: http://ja.wikipedia.org/ad hoc>
Non-Patent Literature 2: "Ad-hoc on-demand distance vector (AODV) routing", RFC 3561, 2003
Non-Patent Literature 3: "Optimized link state routing (OLSR) RFC", RFC. 3626, 2003

SUMMARY OF INVENTION

Technical Problem

In the case of exchanging packets between the communication devices via the wireless ad hoc network, the packets are transferred between the communication devices through the communication route through one or a plurality of wireless terminal devices for performing a relay of the packets.

For example, when an abnormality such as a fault of a wireless terminal device and a communication failure occurs in the communication route, a wireless terminal device that detects the abnormality notifies the occurrence of the abnormality to a communication device. The communication device recognizes the occurrence of the abnormality in the communication route, based on the notification from the wireless terminal device, and starts construction of a new communication route.

However, there is a case where the time from the occurrence of the abnormality until the recognition of the abnormality by the communication device becomes long in the communication route. In this case, between the communication devices, the time during which the packets cannot be exchanged becomes long.

The present invention has been made to solve the above problem. An object of the invention is to provide a communication device, a communication system, a communication control method, and a communication control program capable of changing the communication route by promptly detecting a necessity for the change, in a communication system in which communication is performed using a communication route through one or a plurality of wireless terminal devices.

Solution to Problem (1) In order to solve the above problem, a communication device according to a certain aspect of the present invention includes: a communicating unit that can communicate with another communication device by using a communication route through one or a plurality of wireless terminal devices, and that communicates with the another communication device in accordance with a predetermined rule; and a reconstruction processing unit that performs a process of changing the communication route when a state against the predetermined rule occurs. The reconstruction processing unit decides whether to perform a process of changing the communication route, based on an arrival state of a communication signal destined for the own communication device regularly transmitted from the another communication device.

(5) In order to solve the above problem, a communication system according to a certain aspect of the present invention includes: a plurality of wireless terminal devices capable of relaying communication; and a communication device that can communicate with another communication device by using a communication route through one or a plurality of the wireless terminal devices, and that communicates with the another communication device in accordance with a predetermined rule. The communication device performs a process of changing the communication route, when a state against the predetermined rule occurs. The communication device decides whether to perform a process of changing the communication route, based on an arrival state of a communication signal destined for the own communication device regularly transmitted from the another communication device.

(8) In order to solve the above problem, a communication control method according to a certain aspect of the present invention is for a communication system including a plurality of wireless terminal devices capable of relaying communication, and a communication device capable of communicating with another communication device by using a communication route through one or a plurality of the wireless terminal devices. The communication control method includes a step for the communication device to communicate with the another communication device in accordance with a predetermined rule, and a step for the communication device to perform a process of changing the communication route when a state against the predetermined rule occurs. In the step of performing a process of changing the communication route, whether to perform a process of changing the communication route is decided, based on an arrival state of a communication signal destined for the own communication device regularly transmitted from the another communication device.

(9) In order to solve the above problem, a communication control program according to a certain aspect of the present invention is used in a communication device. The communication device can communicate with another communication device by using a communication route through one or a plurality of wireless terminal devices. The communication control program makes a computer execute a step of communicating with the another communication device in accordance with a predetermined rule, and a step of performing a process of changing the communication route when a state against the predetermined rule occurs. In the step of performing a process of changing the communication route, whether to perform a process of changing the communication route is decided, based on an arrival state of a communication signal destined for the own communication device regularly transmitted from the another communication device.

Advantageous Effects of Invention

According to the present invention, a communication route can be changed by promptly detecting a necessity for the change, in a communication system in which communication is performed using a communication route through one or a plurality of wireless terminal devices.

DESCRIPTION OF EMBODIMENTS

Figure 1:
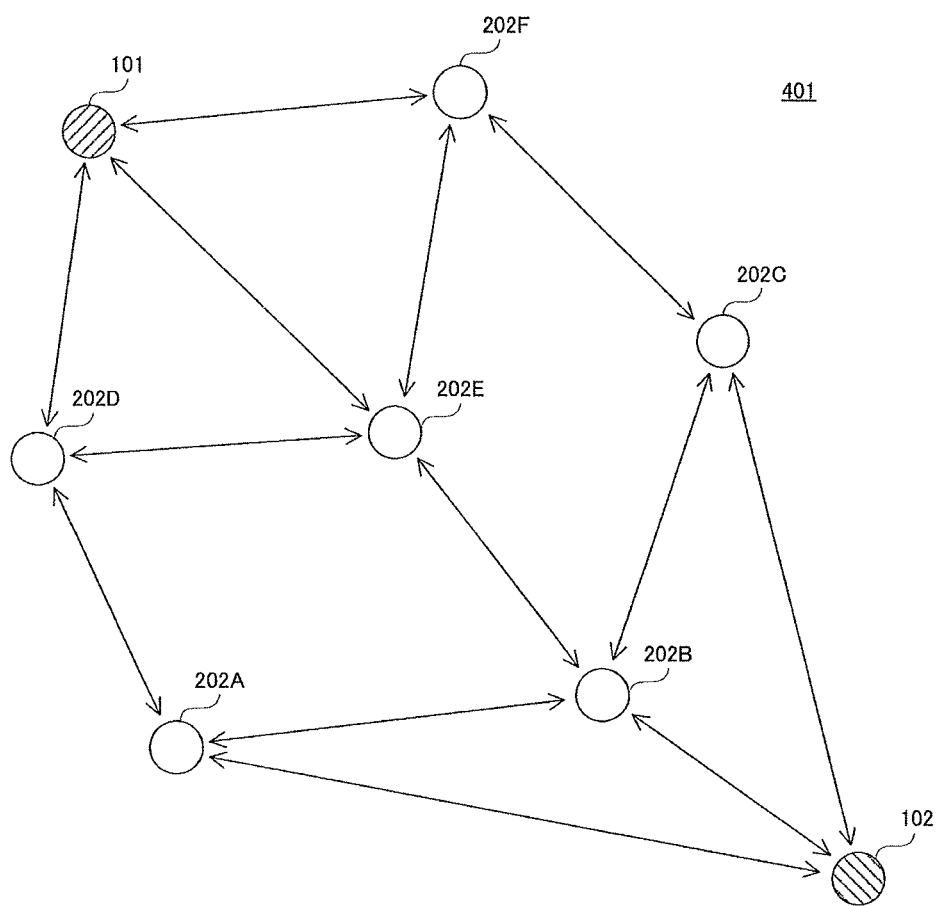
FIG. 1 is a diagram illustrating a configuration of a wireless communication system according to a first embodiment of the present invention.

First, the content of the embodiments of the present invention will be listed and explained.

(1) A communication device according to the embodiment of the present invention includes: a communicating unit that can communicate with another communication device by using a communication route through one or a plurality of wireless terminal devices, and that communicates with the another communication device in accordance with a predetermined rule; and a reconstruction processing unit that performs a process of changing the communication route when a state against the predetermined rule occurs. The reconstruction processing unit decides whether to perform a process of changing the communication route, based on an arrival state of a communication signal destined for the own communication device regularly transmitted from the another communication device.

By using such a configuration, based on the arrival state of the communication signal, the occurrence of a state against the predetermined rule can be recognized easily and promptly. Therefore, whether to perform the process of changing the communication route can be decided efficiently.

That is, because the abnormality of the communication route can be recognized at the timing of the occurrence of a state against the predetermined rule, a necessity for changing the communication route can be promptly detected and the change can be performed.

Accordingly, as compared with the configuration in which the wireless terminal device that detects the occurrence of an abnormality notifies the abnormality to the communication device, the time taken from the occurrence of the abnormality in the communication route to when the communication device recognizes the abnormality can be shortened. Therefore, the period during which communication cannot be performed between the communication device and another communication device can be shortened.

(2) Preferably, the reconstruction processing unit broadcasts route search information destined for the another communication device or wireless terminal device for determining a new communication route.

By using such a configuration, even when the communication device does not understand a communication route to another communication device or wireless terminal device, because the route search information is transmitted to the another communication device or wireless terminal device, the process to be performed by the communication device can be simplified.

Further, because the route search information is transmitted to another communication device or wireless terminal device via a plurality of communication routes, the another communication device or wireless terminal device can select a proper communication route from the plurality of communication routes through which the received route search information has passed.

(3) Preferably, the communication device further includes a storage unit that stores a plurality of kinds of the communication routes. When a state against the predetermined rule occurs, the reconstruction processing unit selects a new communication route from among the plurality of kinds of communication routes stored in the storage unit. The communicating unit performs communication with the another communication device by using the communication route selected by the reconstruction processing unit.

In this way, by the configuration of establishing a new communication route by activating the communication route stored in advance, as compared with the configuration of dynamically establishing a new communication route by using the broadcast route search information, the time required from the occurrence of a state against the predetermined rule until the establishment of a new communication route can be shortened. Therefore, communication between the communication device and another communication device can be restarted at an early stage.

(4) Preferably, the communication device operates in accordance with a protocol having a plurality of layers, the communicating unit communicates by performing a process for a first layer out of the plurality of layers, and the reconstruction processing unit performs a process of changing the communication route by performing a process for a second layer of a higher order than the first layer out of the plurality of layers.

By using such a configuration, information about the abnormality of a communication route detected by the second layer can be used for the process for the first layer. Therefore, as compared with the configuration in which the first layer singly detects the abnormality of the communication route regardless of the process for the second layer, the communication route can be changed by detecting the necessity for the change at an early stage.

Because exchanges of information for the first layer to singly detect the abnormality of the communication route can be made unnecessary, a total load of the communication system configured by a communication device, another communication device, and one or a plurality of wireless terminal devices can be reduced.

(5) A communication system according to the embodiment of the present invention includes: a plurality of wireless terminal devices capable of relaying communication; and a communication device that can communicate with another communication device by using a communication route through one or a plurality of the wireless terminal devices, and that communicates with the another communication device in accordance with a predetermined rule. The communication device performs a process of changing the communication route, when a state against the predetermined rule occurs. The communication device decides whether to perform a process of changing the communication route, based on an arrival state of a communication signal destined for the own communication device regularly transmitted from the another communication device.

By using such a configuration, based on the arrival state of the communication signal, the occurrence of a state against the predetermined rule can be recognized easily and promptly. Therefore, whether to perform the process of changing the communication route can be decided efficiently.

That is, because the abnormality of the communication route can be recognized at the timing of the occurrence of a state against the predetermined rule, a necessity for changing the communication route can be promptly detected and the change can be performed.

Accordingly, as compared with the configuration in which the wireless terminal device that detects the occurrence of an abnormality notifies the abnormality to the communication device, the time taken from the occurrence of the abnormality in the communication route to when the communication device recognizes the abnormality can be shortened. Therefore, the period during which communication cannot be performed between the communication device and another communication device can be shortened.

(6) Preferably, upon detecting the occurrence of a state against the predetermined rule, the communication device requests the another communication device or the wireless terminal device to change the communication route, and the another communication device or the wireless terminal device receives the request from the communication device, and determines a new communication route.

By using such a configuration, even when the another communication device and the wireless terminal device cannot detect the occurrence of a state against the predetermined rule, for example, a necessity for changing the communication route between the communication device and the another communication device or the wireless terminal device can be promptly detected and the change can be performed.

That is, in the communication between the communication device and the another communication device or the wireless terminal device, when at least the communication device has a function of detecting the occurrence of a state against the predetermined rule, a communication route between the communication device and the another communication device or the wireless terminal device can be changed by promptly detecting a necessity for the change. That is, because the configuration of the another communication device and the wireless terminal device can be simplified, a total cost of the communication system can be reduced.

Further, even when the another communication device or the wireless terminal device cannot detect the occurrence of a state against the predetermined rule, for example, the another communication device or the wireless terminal device can recognize the occurrence of a state against the predetermined rule by receiving a request from the communication device, and accordingly, a necessary process can be performed.

(7) More preferably, the communication device broadcasts route search information destined for the another communication device or the wireless terminal device for determining a new communication route. The another communication device or the wireless terminal device determines the new communication route, based on the route search information received via one or a plurality of kinds of the communication routes.

By using such a configuration, even when the communication device does not understand a communication route to another communication device or wireless terminal device, because the route search information is transmitted to the another communication device or wireless terminal device, the process to be performed by the communication device can be simplified.

Further, because the route search information is transmitted to another communication device or wireless terminal device via a plurality of communication routes, the another communication device or wireless terminal device can select a proper communication route from the plurality of communication routes through which the received route search information has passed.

(8) A communication control method according to the embodiment of the present invention is for a communication system including a plurality of wireless terminal devices capable of relaying communication, and a communication device capable of communicating with another communication device by using a communication route through one or a plurality of the wireless terminal devices. The communication control method includes a step for the communication device to communicate with the another communication device in accordance with a predetermined rule, and a step for the communication device to perform a process of changing the communication route when a state against the predetermined rule occurs. In the step of performing a process of changing the communication route, whether to perform a process of changing the communication route is decided, based on an arrival state of a communication signal destined for the own communication device regularly transmitted from the another communication device.

By using such a configuration, based on the arrival state of the communication signal, the occurrence of a state against the predetermined rule can be recognized easily and promptly. Therefore, whether to perform the process of changing the communication route can be decided efficiently.

That is, because the abnormality of the communication route can be recognized at the timing of the occurrence of a state against the predetermined rule, a necessity for changing the communication route can be promptly detected and the change can be performed.

Accordingly, as compared with the configuration in which the wireless terminal device that detects the occurrence of an abnormality notifies the abnormality to the communication device, the time taken from the occurrence of the abnormality in the communication route to when the communication device recognizes the abnormality can be shortened. Therefore, the period during which communication cannot be performed between the communication device and another communication device can be shortened.

(9) A communication control program according to the embodiment of the present invention is used in a communication device. The communication device can communicate with another communication device by using a communication route through one or a plurality of wireless terminal devices. The communication control program makes a computer execute a step of communicating with the another communication device in accordance with a predetermined rule, and a step of performing a process of changing the communication route when a state against the predetermined rule occurs. In the step of performing a process of changing the communication route, whether to perform a process of changing the communication route is decided, based on an arrival state of a communication signal destined for the own communication device regularly transmitted from the another communication device.

By using such a configuration, based on the arrival state of the communication signal, the occurrence of a state against the predetermined rule can be recognized easily and promptly. Therefore, whether to perform the process of changing the communication route can be decided efficiently.

That is, because the abnormality of the communication route can be recognized at the timing of the occurrence of a state against the predetermined rule, a necessity for changing the communication route can be promptly detected and the change can be performed.

Accordingly, as compared with the configuration in which the wireless terminal device that detects the occurrence of an abnormality notifies the abnormality to the communication device, the time taken from the occurrence of the abnormality in the communication route to when the communication device recognizes the abnormality can be shortened. Therefore, the period during which communication cannot be performed between the communication device and another communication device can be shortened.

Embodiments of the present invention will be explained with reference to the drawings. The same or corresponding parts in the drawings will be attached with the same symbols, and their explanation will not be repeated. At least a part of the embodiments described below may be artificially combined together.

First Embodiment (Configuration and Basic Operation)

FIG. 1 is a diagram illustrating a configuration of a wireless communication system according to a first embodiment of the present invention.

Referring to FIG. 1, a wireless communication system (communication system) 401 includes a wireless ad hoc network standardized by RFC 3561 (refer to Non-Patent Literature 2), for example. The wireless communication system 401 includes a master station (communication device) 101, a subordinate station (communication device) 102, and wireless terminal devices 202A to 202F.

Hereinafter, each of the wireless terminal devices 202A to 202F will be also referred to as a wireless terminal device 202. In FIG. 1, six wireless terminal devices 202 are representatively illustrated. However, the wireless communication system 401 may be configured to include a smaller number or a larger number of the wireless terminal devices 202.

The wireless communication system 401 is used for quality management in plants, and for monitoring Intelligent Transport Systems and infrastructures, as an example of the case where a manager in each device of the system is the same. Further, the wireless communication system 401 is used in a wireless ad hoc network connecting each portable telephone, at a casualty time, as an example of the case where a manager in each device of the system is different.

The master station 101, the subordinate station 102, and each wireless terminal device 202 can exchange information by wireless communication with another device positioned in the vicinity. Specifically, the master station 101 can exchange information by wireless communication with wireless terminal devices 202D, 202E, and 202F positioned in the vicinity, for example. Further, the subordinate station 102 can exchange information by wireless communication with wireless terminal devices 202A, 202B, and 202C positioned in the vicinity, for example.

Each wireless terminal device 202 can relay information by wireless communication. Specifically, the wireless terminal device 202E relays information by transmitting the information received from the master station 101 to the wireless terminal device 202B, and by transmitting the information received from the wireless terminal device 202B to the master station 101, for example. The wireless terminal device 202B relays information by transmitting the information received from the wireless terminal device 202E to the subordinate station 102, and by transmitting the information received from the subordinate station 102 to the wireless terminal device 202E.

The master station 101 communicates with the subordinate station 102 by, for example, using a communication route through one or a plurality of wireless terminal devices 202, that is, a communication route including, as a relay device, one or a plurality of wireless terminal devices 202. Specifically, in the example illustrated in FIG. 1, the master station 101 communicates with the subordinate station 102 by using a communication route through the wireless terminal devices 202E and 202B, for example. In this case, the wireless terminal devices 202E and 202B relay the information exchanged between the master station 101 and the subordinate station 102.

The communication route to be used to exchange information between the master station 101 and the subordinate station 102 is not limited to the communication route through the wireless terminal devices 202E and 202B. The communication route to be used to exchange information between the master station 101 and the subordinate station 102 may be the communication route through other than the wireless terminal device 202E or other than 202B.

At least one of the master station 101 and the subordinate station 102 may be able to relay by wireless communication the information exchanged between the wireless terminal devices 202A to 202F.

At least one of the master station 101 and the subordinate station 102 may be able to relay by wireless communication the information exchanged between any wireless terminal devices 202 out of the wireless terminal devices 202A to 202F and the wireless terminal device 202 other than the wireless terminal devices 202A to 202F.

The communication route is established and changed according to a communication state between the devices in the wireless communication system 401 and positions of the devices, for example.

Figure 2:
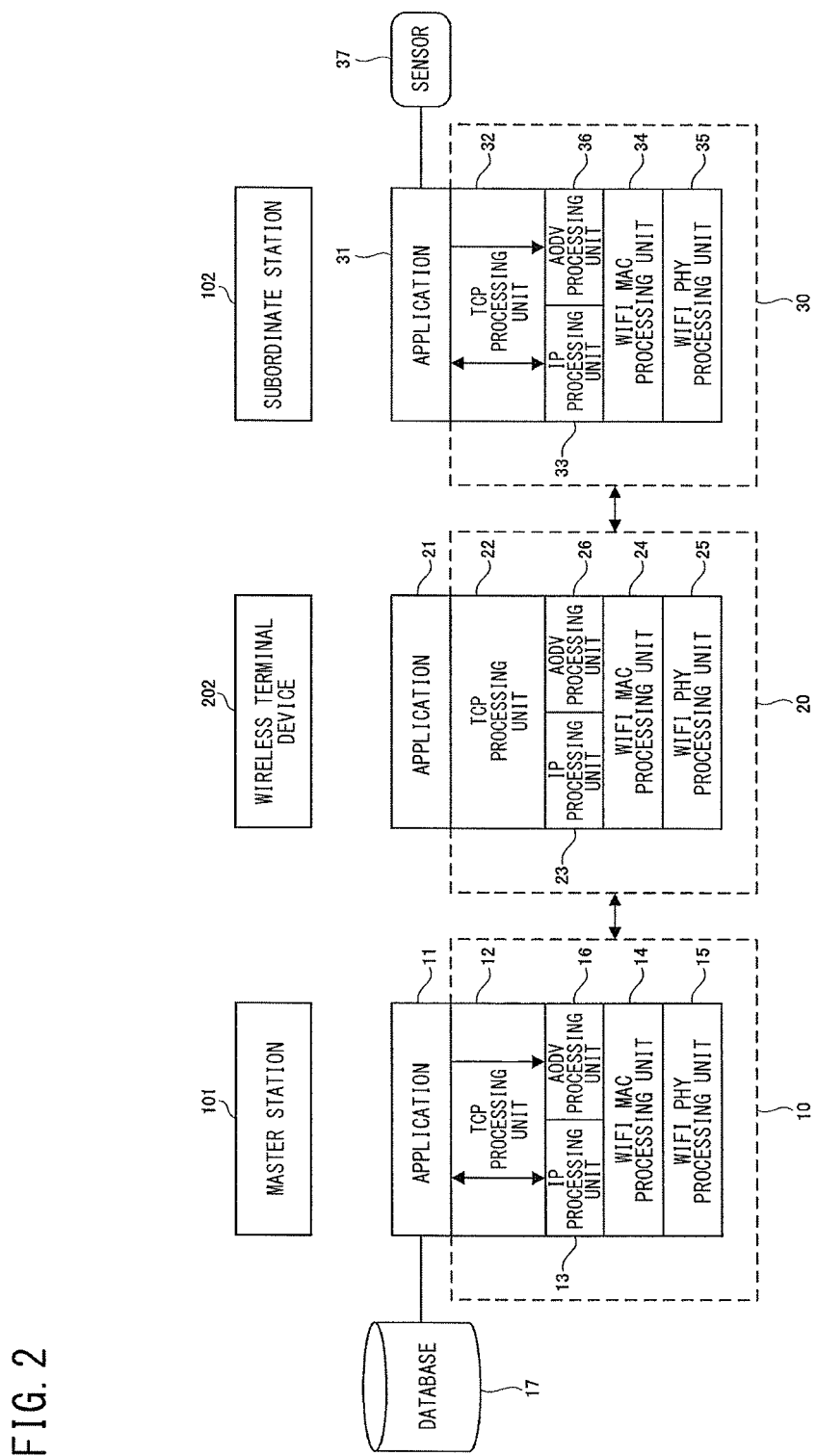
FIG. 2 is a diagram illustrating an example of a software configuration and management control of each device in the wireless communication system according to the first embodiment of the present invention.

FIG. 2 is a diagram illustrating an example of a software configuration and management control of each device in the wireless communication system according to the first embodiment of the present invention.

[Master Station]

Referring to FIG. 2, the master station 101 includes a communicating unit 10, an application 11, and a database 17. The communicating unit 10 includes a TCP processing unit 12, an IP processing unit 13, a WiFi MAC processing unit 14, a WiFi PHY processing unit 15, and an AODV processing unit 16. The application 11 may include a plurality of applications, for example.

The master station 101 operates in accordance with a protocol having a hierarchical plurality of layers. In the master station 101, the application 11 exchanges information with the subordinate station 102 by using a communication route through one or a plurality of wireless terminal devices 202 by processing the application layer, for example.

In the master station 101, the TCP processing unit 12 performs a process for the TCP layer lower than the application layer. The IP processing unit 13 and the AODV processing unit 16 perform a process for the IP layer lower than the TCP layer. The WiFi MAC processing unit 14 performs a process for the MAC layer lower than the IP layer. The WiFi PHY processing unit 15 performs a process for the PITY layer lower than the MAC layer.

The communicating unit 10 receives a communication signal from the subordinate station 102 via one or a plurality of wireless terminal devices 202, converts the received communication signal into an IP frame, and outputs the IP frame to the application 11, for example.

The application 11 acquires data information such as temperature information from the IP frame received from the communicating unit 10, and holds the acquired data information in the database 17, for example.

The application 11 generates control information for controlling the subordinate station 102, based on the information held in the database 17. Then, the application 11 sets an IP address of the subordinate station 102 as a destination IP address of the generated control information, and requests the communicating unit 10 to transmit the control information.

Upon receiving a transmission request for the control information from the application 11, the communicating unit 10 transmits the control information to the subordinate station 102 via one or a plurality of wireless terminal devices 202. More specifically, upon receiving a transmission request from the application 11, the IP processing unit 13 in the communicating unit 10 inquires the AODV processing unit 16 about a next hop IP address as the IP address of the wireless terminal device 202 of the next transmission destination of the control information.

The AODV processing unit 16 holds a route table in which there is recorded a destination IP address and the next hop IP address by relating to each other, for example. When the next hop IP address corresponding to the IP address of the subordinate station 102 as a destination IP address is recorded in the route table, for example, the AODV processing unit 16 outputs the next hop IP address to the IP processing unit 13.

When the next hop IP address corresponding to the IP address of the subordinate station 102 is not recorded in the route table, for example, the AODV processing unit 16 constructs a new communication route. When it is decided that an abnormality occurs at the communication route, for example, the AODV processing unit 16 changes the communication route. In the case of constructing a new communication route or in the case of changing the communication route, the AODV processing unit 16 updates the route table, for example.

Then, the AODV processing unit 16 acquires the next hop IP address from the updated route table, and outputs the acquired next hop IP address to the IP processing unit 13, for example. Details of the construction of the new communication route and the change of the communication route will be described later.

Upon receiving the next hop IP address from the AODV processing unit 16, the IP processing unit 13 transmits the IP packet including the control information to the wireless terminal device 202 having the next hop IP address via the WiFi MAC processing unit 14 and the WiFi PHY processing unit 15.

[Wireless Terminal Device]

The wireless terminal device 202 includes a communicating unit 20 and an application 21. The communicating unit 20 includes a TCP processing unit 22, an IP processing unit 23, a WiFi MAC processing unit 24, a WiFi PHY processing unit 25, and an AODV processing unit 26. The application 21 may include a plurality of application, for example.

The wireless terminal device 202 operates in accordance with a protocol having a plurality of hierarchical layers. In the wireless terminal device 202, the application 21 performs a process for the application layer, for example. The TCP processing unit 22 performs a process for the TCP layer lower than the application layer. The IP processing unit 23 and the AODV processing unit 26 perform a process for the IP layer lower than the TCP layer. The WiFi MAC processing unit 24 performs a process for the MAC layer lower than the IP layer. The WiFi PEW processing unit 25 performs a process for the PHY layer lower than the MAC layer.

The communicating unit 20 receives a communication signal from the master station 101, the subordinate station 102 or another wireless terminal device 202, and relays the received communication signal.

More specifically, upon receiving an IP packet from the master station 101, the subordinate station 102 or another wireless terminal device 202 via the WiFi MAC processing unit 24 and the WiFi PHY processing unit 25, the IP processing unit 23 in the communicating unit 20 inquires the AODV processing unit 26 about the next hop IP address of the next transmission destination of the received IP packet.

The AODV processing unit 26 holds a route table in which there is recorded a destination IP address and the next hop IP address by relating to each other, for example. Upon receiving an inquiry about the next hop IP address from the IP processing unit 23, the AODV processing unit 26 refers to the route table, and extracts the next hop IP address corresponding to the destination IP address of the IP packet, for example. Then, the AODV processing unit 26 outputs the extracted next hop IP address to the IP processing unit 23.

Upon receiving the next hop IP address from the AODV processing unit 26, the IP processing unit 23 transmits the IP packet to the master station 101 having the next hop IP address, the subordinate station 102, or another wireless terminal device 202 via the WiFi MAC processing unit 24 and the WiFi PHY processing unit 25.

[Subordinate Station]

The subordinate station 102 includes a communicating unit 30, an application 31, and a sensor 37. The communicating unit 30 includes a TCP processing unit 32, an IP processing unit 33, a WiFi MAC processing unit 34, a WiFi PHY processing unit 35, and an AODV processing unit 36. The application 31 may include a plurality of applications, for example.

The sensor 37 is specifically a temperature sensor. The sensor 37 may be, for example, an acceleration sensor, an oscillation sensor, or the like.

The subordinate station 102 operates in accordance with a protocol having a plurality of hierarchical layers. In the subordinate station 102, the application 31 exchanges information with the master station 101 by using a communication route through one or a plurality of wireless terminal devices 202, by performing a process for the application layer, for example.

In the subordinate station 102, the TCP processing unit 32 performs a process for the TCP layer lower than the application layer. The IP processing unit 33 and the AODV processing unit 36 perform a process for the IP layer lower than the TCP layer. The WiFi MAC processing unit 34 performs a process for the MAC layer lower than the IP layer. The WiFi PHY processing unit 35 performs a process for the PHY layer lower than the MAC layer.

The communicating unit 30 receives a communication signal from the master station 101 via one or a plurality of wireless terminal devices 202, converts the received communication signal into an IP frame, and outputs the IP frame to the application 31, for example.

The application 31 acquires control information from the IP frame received from the communicating unit 30, and makes the own subordinate station 102 perform the operation in accordance with the control information.

Further, the application 31 generates temperature information from a temperature measured by the sensor 37, for example, as data information. The application 31 cyclically generates data information, specifically at every 125 milliseconds. Then, the application 31 sets an IP address of the master station 101 as a destination IP address of the generated data information, and requests the communicating unit 30 to transmit the data information, for example.

Upon receiving a transmission request for the data information from the application 31, the communicating unit 30 transmits the data information to the master station 101 via one or a plurality of wireless terminal devices 202. More specifically, upon receiving a transmission request from the application 31, the IP processing unit 33 in the communicating unit 30 inquires the AODV processing unit 36 about a next hop IP address of the next transmission destination of the data information.

The AODV processing unit 36 holds a route table in which there is recorded a destination IP address and the next hop IP address by relating to each other, for example. When the next hop IP address corresponding to the IP address of the master station 101 as a destination IP address is recorded in the route table, for example, the AODV processing unit 36 outputs the next hop IP address to the IP processing unit 33.

When the next hop IP address corresponding to the IP address of the master station 101 is not recorded in the route table, for example, the AODV processing unit 36 constructs a new communication route. When it is decided that an abnormality occurs at the communication route, for example, the AODV processing unit 36 changes the communication route. In the case of constructing a new communication route or in the case of changing the communication route, the AODV processing unit 36 updates the route table, for example.

Then, the AODV processing unit 36 acquires the next hop IP address from the updated route table, and outputs the acquired next hop IP address to the IP processing unit 33, for example.

Upon receiving the next hop IP address from the AODV processing unit 36, the IP processing unit 33 transmits the IP packet including the data information to the wireless terminal device 202 having the next hop IP address via the WiFi MAC processing unit 34 and the WiFi PHY processing unit 35.

In the wireless communication system 401, the communication route of the ad hoc network is constructed and changed by the process for the IP layer performed by the AODV processing units 16, 26, and 36. Hereinafter, there will be described in detail a procedure that the AODV processing units 16, 26, and 36 construct a new communication route, and a procedure that the AODV processing unit 16, 26, and 36 detect an abnormality of the communication route and change the communication route.

[Establishment of New Communication Route]

Figure 3:
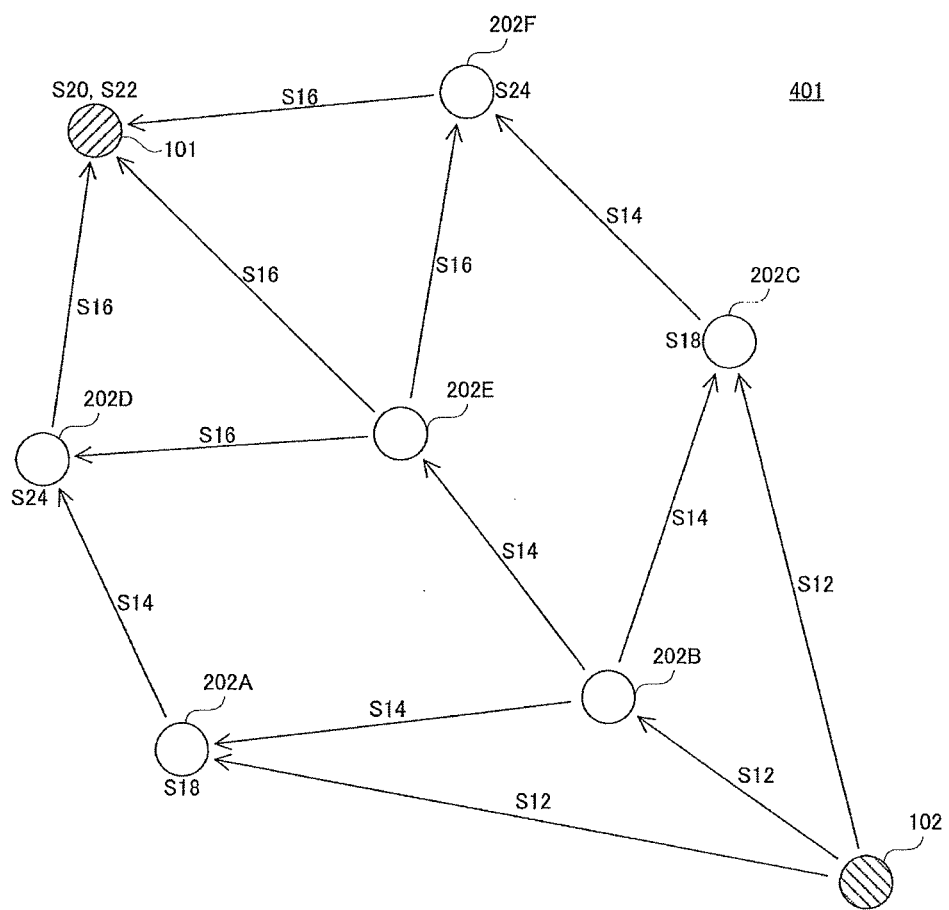
FIG. 3 illustrates an example of a route of a RREQ message to be transmitted and received by each device in the wireless communication system according to the first embodiment of the present invention.

FIG. 3 illustrates an example of a route of a RREQ message to be transmitted and received by each device in the wireless communication system according to the first embodiment of the present invention.

By referring to FIG. 3, there will be assumed a state that a communication route is not established between the master station 101 and the subordinate station 102.

First, the subordinate station 102 generates an RREQ (Route Request) message as route search information destined for the master station 101 to newly establish a communication route between the subordinate station 102 and the master station 101, and broadcasts the generated RREQ message, for example. The RREQ message includes the IP address of the master station 101 as a destination IP address, the IP address of the subordinate station 102 as an originator IP address, number of hops initialized at zero, the ID of the RREQ message, and the like (Step S12).

Next, upon receiving the RREQ message from the subordinate station 102, the wireless terminal devices 202A, 202B, and 202C positioned near the subordinate station 102 confirm whether the destination IP address included in the received RREQ message and the own IP address are the same, for example. When the destination IP address and the own IP address are not the same, for example, the wireless terminal devices 202A, 202B, and 202C increment the number of hops included in the RREQ message. Then, the wireless terminal devices 202A, 202B, and 202C record the originator IP address included in the RREQ message and the IP address of the subordinate station 102 that transmits the RREQ message, in the route table respectively relating as the destination IP address and the next hop IP address, and thereafter, broadcast the RREQ message, for example (Step S14).

Next, upon receiving the RREQ message from the wireless terminal devices 202A, 202B, and 202C, the wireless terminal devices 202D, 202E, and 202F confirm whether the destination IP address included in the received RREQ message and the own IP address are the same, for example. When the destination IP address and the own IP address are not the same, for example, the wireless terminal devices 202D, 202E, and 202F increment the number of hops included in the RREQ message. Then, the wireless terminal devices 202D, 202E, and 202F record the originator IP address included in the RREQ message and the IP address of the wireless terminal device 202 that transmits the RREQ message, in the route table respectively relating as the destination IP address and the next hop IP address, and thereafter, broadcast the RREQ message, for example (Step S16).

Upon receiving the RREQ message from the wireless terminal device 202B, the wireless terminal devices 202A and 202C recognize that the RREQ message has been received in duplicate, based on the originator IP address and the ID included in the RREQ message, and abandon the RREQ message received from the wireless terminal device 202B, for example (Step S18).

Next, upon receiving the RREQ message from the wireless terminal devices 202D, 202E, and 202F, the master station 101 confirms whether the destination IP address included in the received RREQ message and the own IP address are the same, for example. The master station 101 performs the following process when the destination IP address and the own IP address are the same. That is, the master station 101 acquires the time when a RREQ message is received and the number of hops included in the RREQ message, for example. Then, the master station 101 records the originator IP address included in the RREQ message and the IP address of the wireless terminal device 202 that transmits the RREQ message, in the route table respectively relating as the destination IP address and the next hop IP address, for example (Step S20).

Next, the master station 101 selects one RREQ message, based on the reception time of each RREQ message and the number of hops, out of the RREQ messages received from a plurality of wireless terminal devices 202, for example. The master station 101 determines the route through which the selected RREQ message passes, as a communication route (Step S22).

Upon receiving the RREQ message from the wireless terminal device 202E, the wireless terminal devices 202D and 202F recognize that the RREQ message has been received in duplicate, based on the originator IP address and the ID included in the RREQ message, and abandon the RREQ message received from the wireless terminal device 202E, for example (Step S24).

For example, the master station 101 selects one RREQ message, based on the reception time, because the number of hops of each RREQ message received from the wireless terminal devices 202D, 202E, and 202F is the same in Step S20. More specifically, when the reception time of each RREQ message is different, for example, the master station 101 selects a RREQ message which is received at the earliest time. Specifically, when a RREQ message from the wireless terminal device 202E is received at the earliest reception time, for example, the master station 101 selects the RREQ message, and determines the route through which the selected RREQ message passes, as a communication route. That is, the master station 101 determines the route through which it takes a shortest time to transfer the information, as a communication route.

The master station 101 and the wireless terminal devices 202A to 202F update the route table based on the received RREQ message, in Steps S14, S16, and S20.

Accordingly, in the route table held by the master station 101 and the wireless terminal devices 202A to 202F, the IP address of the subordinate station 102 as the destination IP address and the next hop IP address are recorded by relating to each other. Therefore, the master station 101 and the wireless terminal devices 202A to 202F can correctly transfer the packet destined for the subordinate station 102.

Figure 4:
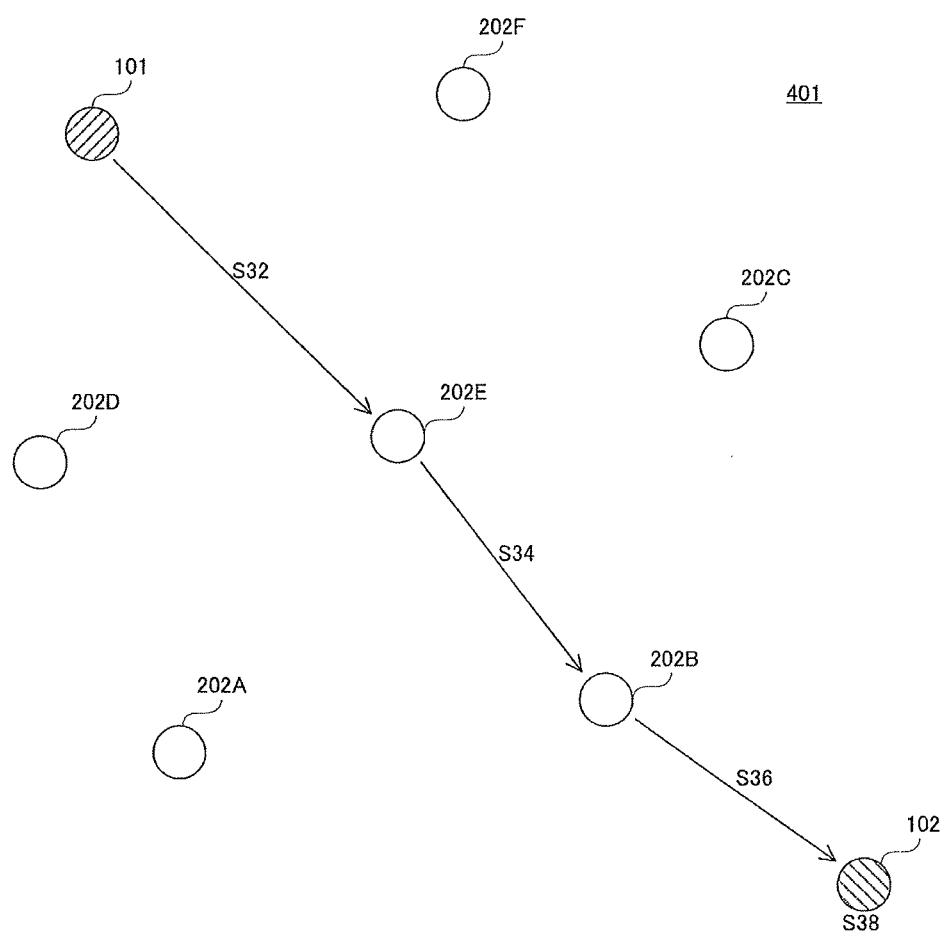
FIG. 4 illustrates an example of a route of an RREP message to be transmitted and received by each device in the wireless communication system according to the first embodiment of the present invention.

FIG. 4 illustrates an example of a route of an RREP message to be transmitted and received by each device in the wireless communication system according to the first embodiment of the present invention.

By referring to FIG. 4, there will be assumed a state that, as described above, the master station 101 receives the RREQ message from the wireless terminal device 202E at the earliest reception time and determines the route through which the RREQ message has passed, as a communication route.

First, the master station 101 generates an RREP (Route Reply) message destined for the subordinate station 102 to notify the subordinate station 102 of the communication route, for example. Then, the master station 101 sets the IP address of the wireless terminal device 202E as the next hop IP address of the RREP message, and unicasts the RREP message, based on the route table held by the self and a determination result of the communication route, for example. The RREP message includes the IP address of the master station 101 as a destination IP address, the IP address of the subordinate station 102 as an originator IP address, number of hops initialized at zero, and the like (Step S32).

Next, upon receiving the RREP message from the master station 101, the wireless terminal device 202E confirms whether the originator IP address included in the received RREP message and the own IP address are the same, for example. When the originator IP address and the own IP address are not the same, for example, the wireless terminal device 202E increments the number of hops included in the RREP message. The wireless terminal device 202E records the destination IP address included in the RREP message and the IP address of the master station 101 that transmits the RREP message, in the route table respectively relating as the destination IP address and the next hop IP address, for example. Then, the wireless terminal device 202E sets the IP address of the wireless terminal device 202B as the next hop IP address of the RREP message, and unicasts the RREP message, based on the originator IP address and the content recorded in the route table, for example (Step S34).

Next, upon receiving the RREP message from the wireless terminal device 202E, the wireless terminal device 202B confirms whether the originator IP address included in the received RREP message and the own IP address are the same, for example. When the originator IP address and the own IP address are not the same, for example, the wireless terminal device 202B increments the number of hops included in the RREP message. The wireless terminal device 202B records the destination IP address included in the RREP message and the IP address of the wireless terminal device 202E that transmits the RREP message, in the route table respectively relating as the destination IP address and the next hop IP address, for example. Then, the wireless terminal device 202B sets the IP address of the subordinate station 102 as the next hop IP address of the RREP message, and unicasts the RREP message, based on the originator IP address and the content recorded in the route table, for example (Step S36).

Next, upon receiving the RREP message from the wireless terminal device 202B, the subordinate station 102 confirms whether the originator IP address included in the received RREP message and the own IP address are the same, for example. When the originator IP address and the own IP address are the same, for example, the subordinate station 102 records the destination IP address included in the RREP message and the IP address of the wireless terminal device 202B that transmits the RREP message, in the route table respectively relating as the destination IP address and the next hop IP address. Then, after acquiring the number of hops included in the RREP message, the subordinate station 102 abandons the RREP message (Step S38).

For example, the wireless terminal device 202E, the wireless terminal device 202B, and the subordinate station 102 update the route table based on the received RREP message, in Steps S34, S36, and S38, respectively.

Accordingly, in the route table held by the wireless terminal device 202E, the wireless terminal device 202B, and the subordinate station 102, an IP address of the master station 101 as a destination IP address and a next hop IP address are recorded by relating to each other. Therefore, the wireless terminal device 202E, the wireless terminal device 202B, and the subordinate station 102 can correctly transfer the packet destined for the master station 101.

That is, between the master station 101 and the subordinate station 102, there is established a communication route through the wireless terminal devices 202E and 202B.

Further, for example, in Steps S14 and S16, when the wireless terminal device 202 has a communication route to the master station 101, that is, when the wireless terminal device 202 has, in the route table held by the self, a portion where the IP address of the master station 101 as a destination IP address and the IP address as the next hop IP address are recorded by relating to each other, the wireless terminal device 202 performs the following process.

That is, upon receiving an RREQ message, for example, the wireless terminal device 202 determines the route through which the received RREQ message passed, as a communication route, and transmits the RREP message as a response to the RREQ message, to the subordinate station 102, in place of relaying the RREQ message.

Accordingly, in the wireless communication system 401, load of communication due to the broadcasting of the RREQ message can be reduced, and a time required to determine the communication route can be shortened.

In the wireless communication system 401 according to the first embodiment of the present invention, the subordinate station 102 transmits the RREQ message to the master station 101, and the master station 101 transmits the RREP message as a response to the RREQ message, to the subordinate station 102. However, the configuration is not limited to this. For example, the configuration may that the master station 101 transmits the RREQ message to the subordinate station 102, and the subordinate station 102 transmits the RREP message as a response to the RREQ message, to the master station 101.

[State Confirmation of Communication Route]

Figure 5:
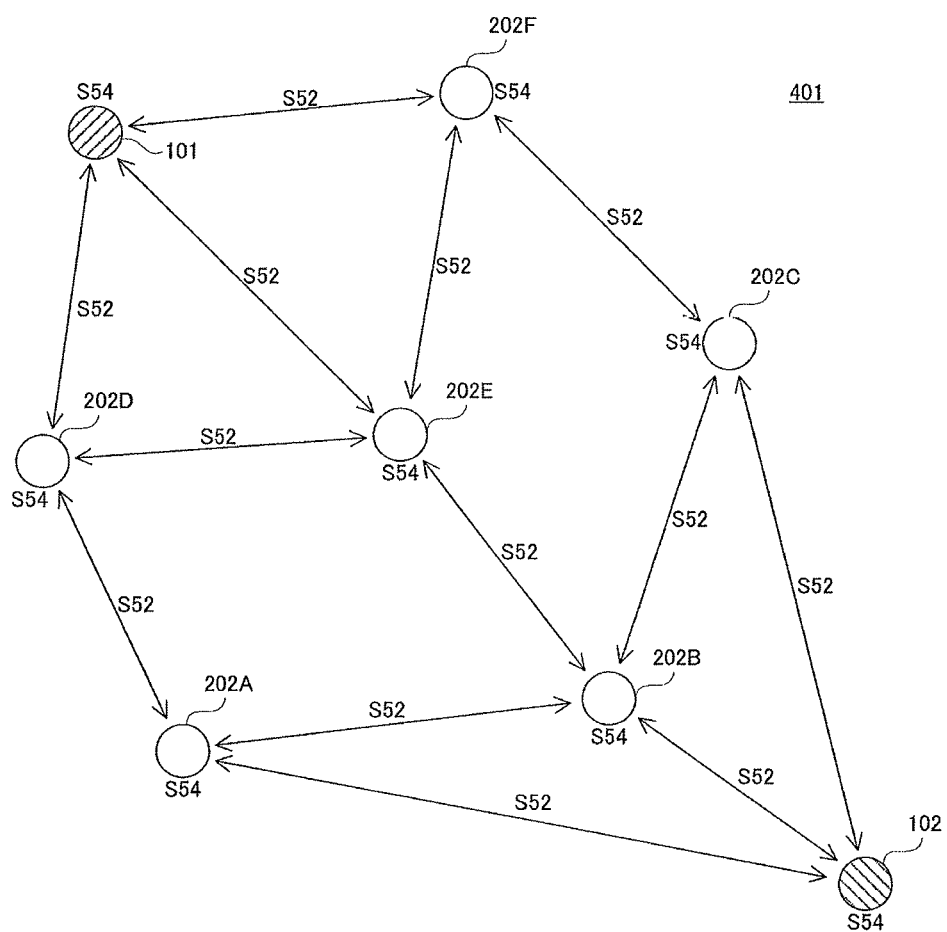
FIG. 5 illustrates an example of a route of a hello message to be transmitted and received by each device in the wireless communication system according to the first embodiment of the present invention.

FIG. 5 illustrates an example of a route of a hello message to be transmitted and received by each device in the wireless communication system according to the first embodiment of the present invention.

Referring to FIG. 5, the master station 101, the subordinate station 102, and the wireless terminal devices 202A to 202F in the wireless communication system 401 cyclically, specifically, in every ten second cycle, broadcast a hello message for confirming whether the communication is normal (Step S52).

Next, when a hello message can be correctly cyclically received from a device positioned near the self, for example, the master station 101, the subordinate station 102, and the wireless terminal devices 202A to 202F recognize that the device near the self correctly operates (Step S54).

In Step S52, the timing when each device in the wireless communication system 401 transmits a hello message may be the same or different.

[Notification of Abnormality in Communication Route]

Figure 6:
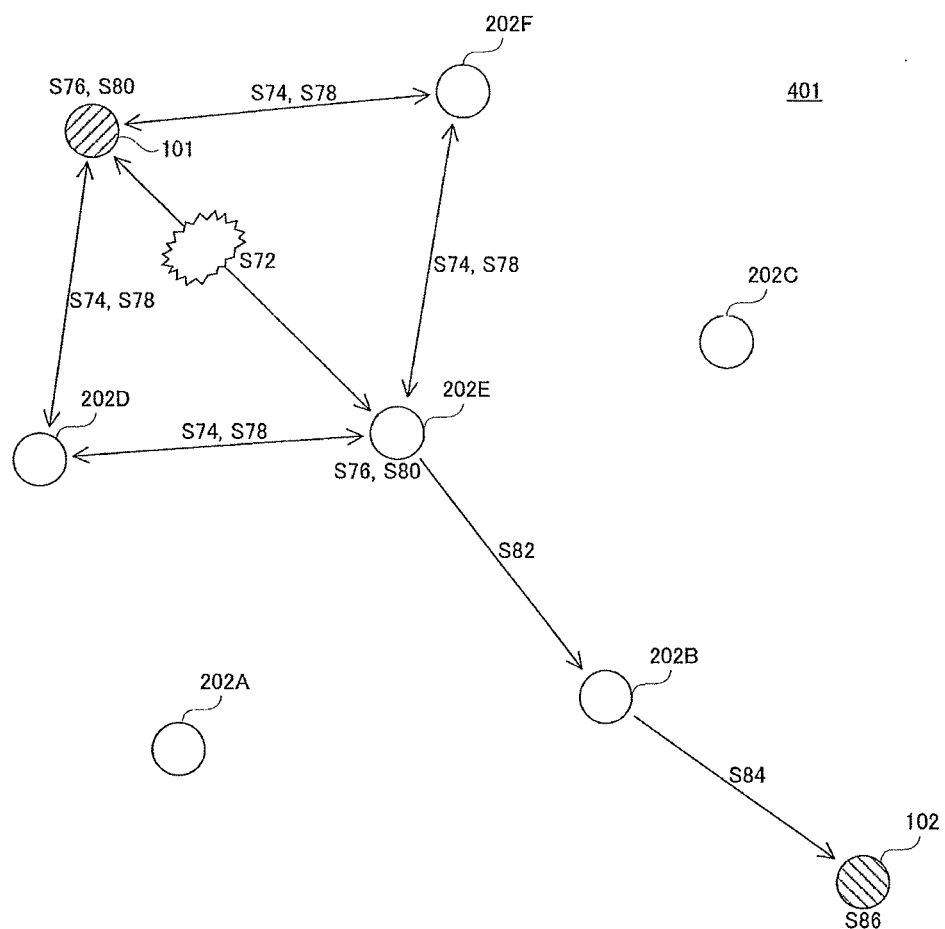
FIG. 6 is a diagram illustrating an example of the operation of detecting an abnormality occurring at a communication route, performed by each device in the wireless communication system according to the first embodiment of the present invention.

FIG. 6 is a diagram illustrating an example of the operation of detecting an abnormality occurring at a communication route, performed by each device in the wireless communication system according to the first embodiment of the present invention.

By referring to FIG. 6, there will be assumed a state that a communication route through the wireless terminal devices 202E and 202B is established between the master station 101 and the subordinate station 102. Further, the master station 101, the subordinate station 102, and each wireless terminal device 202 confirm whether the device positioned near the self normally operates, by cyclically transmitting and receiving a hello message, as illustrated in FIG. 5.

First, there occurs a state that communication cannot be performed between the master station 101 and the wireless terminal device 202E, for example (Step S72).

Next, the master station 101 and the wireless terminal devices 202D, 202E, and 202F broadcast a hello message, at a transmission timing of the hello message in a ten second cycle, for example (Step S74). Although not illustrated, the subordinate station 102 and the wireless terminal devices 202A, 202B, and 202C also broadcast a hello message at a transmission timing of the hello message, for example.

Next, the master station 101 and the wireless terminal device 202E recognize that a hello message to be cyclically received from the wireless terminal device 202E and the master station 101, respectively, has not been received, for example (Step S76).

Next, the master station 101 and the wireless terminal devices 202D, 202E, and 202F broadcast a hello message at the next transmission timing, for example (Step S78). Although not illustrated, the subordinate station 102 and the wireless terminal devices 202A, 202B, and 202C also broadcast a hello message at the next transmission timing, for example.

Next, the master station 101 and the wireless terminal device 202E recognize that a hello message to be cyclically received has not been received twice continuously, and decide that there has occurred a state that communication cannot be performed between the master station 101 and the wireless terminal device 202E, for example (Step S80).

Next, the wireless terminal device 202E unicasts an RERR (Route Error) message indicating a state that the IP address of the master station 101 became an unreached transmission destination IP address to which communication cannot be performed to the wireless terminal device 202B positioned near the self, for example (Step S82). In this case, the wireless terminal device 202E invalidates, in the route table held by the self, the portion where the IP address of the master station 101 as a destination IP address and the IP address of the master station 101 as the next hop IP address are recorded by relating to each other, for example.

Next, upon receiving an RERR message from the wireless terminal device 202E, the wireless terminal device 202B unicasts the received RERR message to the subordinate station 102 positioned near the self, for example (Step S84). In this case, the wireless terminal device 202E invalidates, in the route table held by the self, the portion where the IP address of the master station 101 as a destination IP address and the IP address of the wireless terminal device 202E as the next hop IP address are recorded by relating to each other, for example.

Next, upon receiving an RERR message from the wireless terminal device 202B, the subordinate station 102 performs the following process, based on the received RERR message, for example. That is, the subordinate station 102 invalidates, in the route table held by the self, the portion where the IP address of the master station 101 as a destination IP address and the IP address of the wireless terminal device 202B as the next hop IP address are recorded by relating to each other, for example (Step S86).

The wireless terminal device 202E and the wireless terminal device 202B unicast the RERR message in Steps S82 and S84, respectively, but may broadcast.

[Change of Communication Route]

Figure 7:
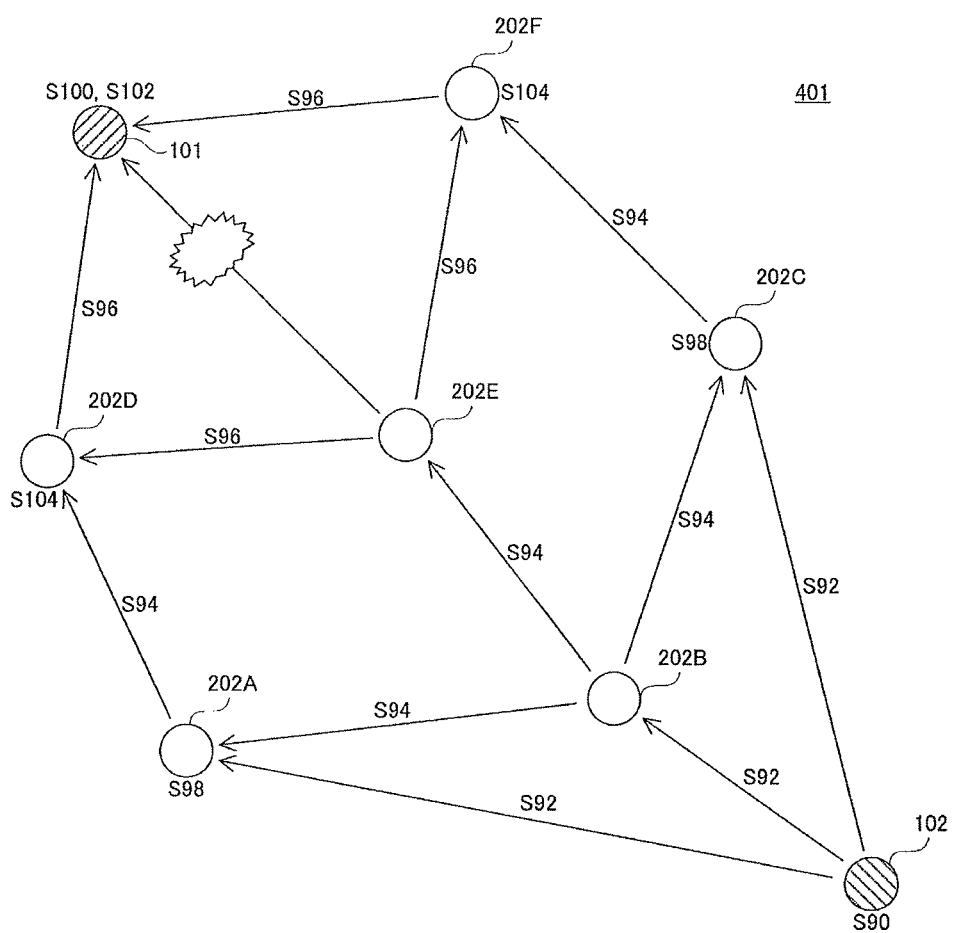
FIG. 7 illustrates an example of the operation of changing a communication route, performed by each device in the wireless communication system according to the first embodiment of the present invention.

FIG. 7 illustrates an example of the operation of changing a communication route, performed by each device in the wireless communication system according to the first embodiment of the present invention.

By referring to FIG. 7, there will be assumed a state that, as described above, the wireless terminal devices 202E and 202B and the subordinate station 102 received an RERR message and invalidated a part of the route table held by the self, based on the received RERR message.

First, the application 31 in the subordinate station 102 illustrated in FIG. 2 generates temperature information as data information at every 125 milliseconds, for example. Then, the application 31 sets an IP address of the master station 101 as a destination IP address of the generated data information, and requests the IP processing unit 33 to transmit the data information, for example. Upon receiving a transmission request from the application 31, the IP processing unit 33 inquires the AODV processing unit 36 about the next hop IP address of the data information (Step S90).

Next, the AODV processing unit 36 refers to the route table, and recognizes that the portion where the IP address of the master station 101 as a destination IP address and the IP address of the wireless terminal device 202B as the next hop IP address are recorded by relating to each other, is invalidated. Then, the AODV processing unit 36 prepares the RREQ message as route search information destined for the master station 101 to change the communication route between the subordinate station 102 and the master station 101, and broadcasts the generated RREQ message (Step S92).

Because the operation in Steps S92 to S98 is similar to the operation in Steps S12 to S18 illustrated in FIG. 3, a detailed description will not be repeated here.

Next, upon receiving the RREQ message from the wireless terminal devices 202D and 202F, the master station 101 confirms whether the destination IP address included in the received RREQ message and the own IP address are the same, for example. The master station 101 performs the following process when the destination IP address and the own IP address are the same. That is, the master station 101 acquires the time when a RREQ message is received and the number of hops included in the RREQ message. Then, the master station 101 records the originator IP address included in the RREQ message and the IP address of the wireless terminal device 202 that transmits the RREQ message, in the route table respectively relating as the destination IP address and the next hop IP address, for example (Step S100).

Next, the master station 101 selects one RREQ message, based on the reception time of each RREQ message and the number of hops, out of the RREQ messages received from a plurality of wireless terminal devices 202, for example. The master station 101 determines the route through which the selected RREQ message passed, as a communication route (Step S102).

Upon receiving the RREQ message from the wireless terminal device 202E, the wireless terminal devices 202D and 202F recognize that the RREQ message has been received in duplicate, based on the originator IP address and the ID included in the RREQ message, and abandon the RREQ message received from the wireless terminal device 202E, for example (Step S104).

For example, the master station 101 selects one RREQ message, based on the reception time, because the number of hops of each RREQ message received from the wireless terminal devices 202D and 202F is the same in Step S100. Specifically, when a RREQ message from the wireless terminal device 202D is received at the earliest reception time, for example, the master station 101 selects the RREQ message, and determines the route through which the selected RREQ message passed, as a communication route.

Figure 8:
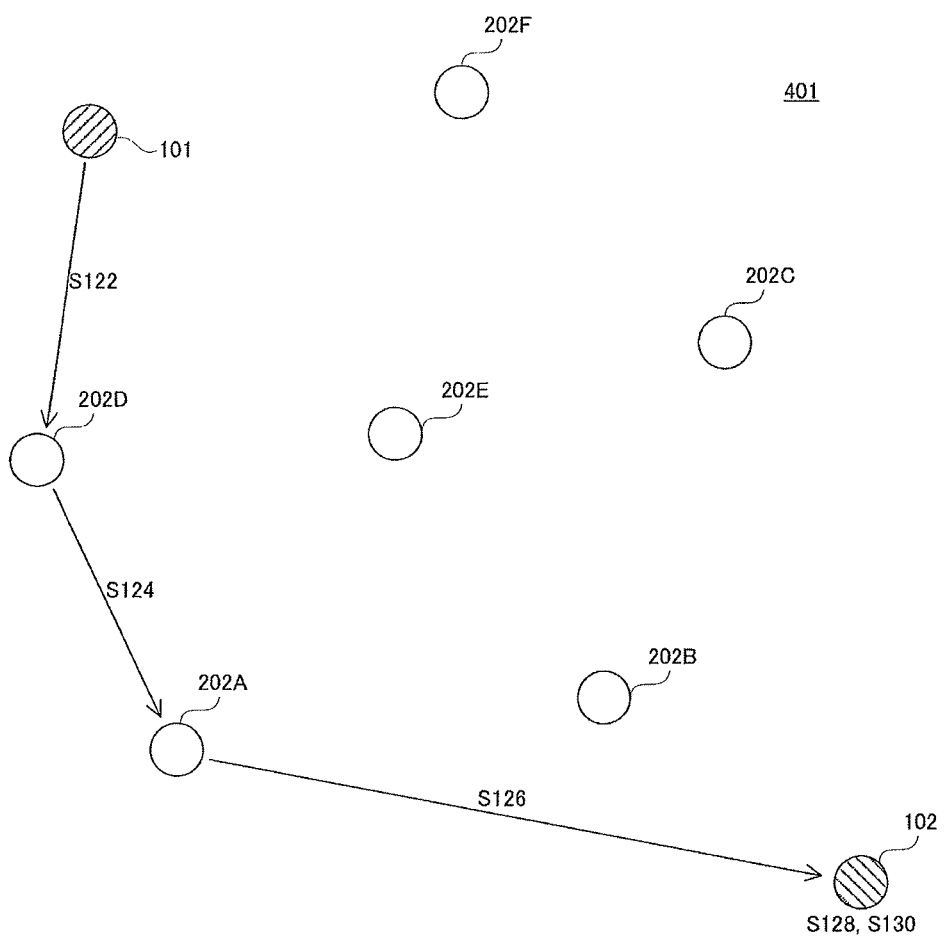
FIG. 8 illustrates an example of the operation of changing a communication route, performed by each device in the wireless communication system according to the first embodiment of the present invention.

FIG. 8 illustrates an example of the operation of changing a communication route, performed by each device in the wireless communication system according to the first embodiment of the present invention.

By referring to FIG. 8, there will be assumed a state that, as described above, the master station 101 receives the RREQ message from the wireless terminal device 202D at the earliest reception time and determines the route through which the RREQ message has passed, as a communication route, for example.

First, the master station 101 generates an RREP message destined for the subordinate station 102 to notify the subordinate station 102 of the communication route, for example. Then, the master station 101 sets the IP address of the wireless terminal device 202D as the next hop IP address of the RREP message, and unicasts the RREP message, based on the route table held by the self and a determination result of the communication route, for example. The RREP message includes the IP address of the master station 101 as a destination IP address, the IP address of the subordinate station 102 as an originator IP address, number of hops initialized at zero, and the like (Step S122).

Next, upon receiving the RREP message from the master station 101, the wireless terminal device 202D confirms whether the originator IP address included in the received RREP message and the own IP address are the same, for example. When the originator IP address and the own IP address are not the same, for example, the wireless terminal device 202D increments the number of hops included in the RREP message. The wireless terminal device 202D records the destination IP address included in the RREP message and the IP address of the master station 101 that transmits the RREP message, in the route table respectively relating as the destination IP address and the next hop IP address, for example. Then, the wireless terminal device 202D sets the IP address of the wireless terminal device 202A as the next hop IP address of the RREP message, and unicasts the RREP message, based on the originator IP address and the content recorded in the route table, for example (Step S124).

Next, upon receiving the RREP message from the wireless terminal device 202D, the wireless terminal device 202A confirms whether the originator IP address included in the received RREP message and the own IP address are the same, for example. When the originator IP address and the own IP address are not the same, for example, the wireless terminal device 202A increments the number of hops included in the RREP message. The wireless terminal device 202A records the destination IP address included in the RREP message and the IP address of the wireless terminal device 202D that transmits the RREP message, in the route table respectively relating as the destination IP address and the next hop IP address, for example. Then, the wireless terminal device 202A sets the IP address of the subordinate station 102 as the next hop IP address of the RREP message, and unicasts the RREP message, based on the originator IP address and the content recorded in the route table, for example (Step S126).

Next, upon receiving the RREP message from the wireless terminal device 202A, for example, the subordinate station 102 confirms whether the originator IP address included in the received RREP message and the own IP address are the same. When the originator IP address and the own IP address are the same, for example, the subordinate station 102 records the destination IP address included in the RREP message and the IP address of the wireless terminal device 202A that transmits the RREP message, in the route table respectively relating as the destination IP address and the next hop IP address. Then, after acquiring the number of hops included in the RREP message, the subordinate station 102 abandons the RREP message (Step S128).

Next, because the process of changing the communication route between the subordinate station 102 and the master station 101 was completed, the AODV processing unit 36 in the subordinate station 102 illustrated in FIG. 2 outputs the IP address of the wireless terminal device 202A to the IP processing unit 33, based on the route table after the change, in response to the inquiry about the next hop IP address from the IP processing unit 33 (Step S130).

[Problem]

Figure 9:
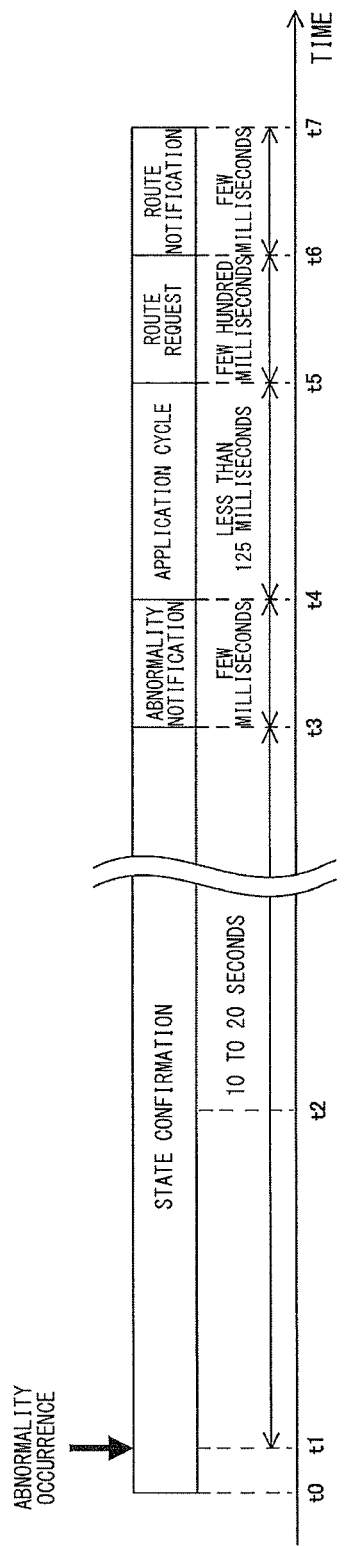
FIG. 9 is a diagram illustrating a comparative example of a time required for a subordinate station to change a communication route in accordance with an AODV protocol when an abnormality occurs at the communication route, according to the first embodiment of the present invention.

FIG. 9 is a diagram illustrating a comparative example of a time required for a subordinate station to change a communication route in accordance with an AODV protocol when an abnormality occurs at the communication route, according to the first embodiment of the present invention.

Referring to FIG. 9, the time corresponding to "state confirmation" is, for example, the time obtained by multiplying the permissible number of times of reception loss of a hello message to the cycle in which the master station 101, the subordinate station 102, and each wireless terminal device 202 in the wireless communication system 401 transmit the hello message. For example, when the transmission cycle is ten seconds and the permissible number of times is two, the time corresponding to the "state confirmation" is 20 seconds.

More specifically, the master station 101, the subordinate station 102, and each wireless terminal device 202, for example, broadcast a hello message at time t0, and confirms that there is no abnormality in the communication route (Steps S52 and S54 illustrated in FIG. 5).

For example, at time t1, an abnormality occurs in a part of the communication route (Step S72 illustrated in FIG. 6).

For example, the master station 101, the subordinate station 102, and each wireless terminal device 202 broadcast a hello message at time t2 and t3 (Steps S74 and S78 illustrated in FIG. 6). On the other hand, the master station 101 and the wireless terminal device 202E recognize that a hello message to be received in a ten second cycle from the wireless terminal device 202E and the master station 101 has not been received, at times t2 and t3, respectively, for example (Steps S76 and S80 illustrated in FIG. 6).

Further, the master station 101 and the wireless terminal device 202E decide that there occurs a state that communication cannot be performed between the master station 101 and the wireless terminal device 202E because the number of times of reception loss of a hello message reaches a permissible number of times at time t3 (Step S80 illustrated in FIG. 6).

That is, the detection required time as a time from when the abnormality occurs at the communication route in the wireless communication system 401 until the master station 101, the subordinate station 102 or each wireless terminal device 202 decides that there occurs a state that communication cannot be performed is longer than a transmission cycle of a hello message and also shorter than two times of the transmission cycle, for example.

The time required for "abnormality notification" is, for example, the time from when the wireless terminal device 202E unicasts the RERR message to the wireless terminal device 202B at time t3 until the subordinate station 102 receives the RERR message at time t4 (Steps S82 to S86 illustrated in FIG. 6).

The transfer time of a message by the unicast is about one second per one hop, for example. Therefore, the time required for "abnormality notification" is a few milliseconds, for example.

The time corresponding to "application cycle" is, for example, the time from when the AODV processing unit 36 illustrated in FIG. 2 receives the RERR message at time t4 (Step S86 illustrated in FIG. 6) until when the IP processing unit 33 receives a transmission request from the application 31 and inquires the AODV processing unit 36 about the next hop IP address of data information at time t5 (Step S90 illustrated in FIG. 7).

Because the AODV protocol is a reactive type protocol, even when an RERR message is received at time t4, for example, the AODV processing unit 36 does not transmit the RREQ message until there is an inquiry about the next hop IP address from the IP processing unit 33 at time t5. Therefore, the time corresponding to the "application cycle" is less than 125 milliseconds as a cycle in which the application 31 outputs to the IP processing unit 33 a transmission request for the data information.

The time required for "route request" is, for example, the time from when the subordinate station 102 broadcasts an RREQ message destined for the master station 101 at time t5 until the master station 101 receives the RREQ message at time t6 (Steps S92 to S102 illustrated in FIG. 7). The transfer time of a message by broadcast is about a few dozens of milliseconds per one hop, for example. Therefore, the time required for "route request" is about a few dozens of milliseconds to a few hundred milliseconds, for example.

The time required for "route notification" is, for example, the time from when the master station 101 unicasts an RREP message destined for the subordinate station 102 at time t6 until the subordinate station 102 receives the RREP message and a communication route is changed at time t7 (Steps S122 to S130 illustrated in FIG. 8). The time required for "route notification" is about a few milliseconds, for example.

As described above, out of the time from when an abnormality occurs in the communication route in the wireless communication system 401 at time t1 until the communication route is changed at time t7, the detection required time is longer than ten seconds. On the other hand, a total time of "abnormality notification", "application cycle", "route request", and "route notification" is a few hundred milliseconds.

Therefore, in order to shorten a time from the occurrence of an abnormality in the communication route until the communication route is changed, it is considered effective to shorten the detection required time.

However, in the case of shortening the transmission cycle of a hello message, for example, a communication load in the wireless communication system 401 increases, and this is not desirable.

Further, in the case of reducing the permissible number of times of reception loss of a hello message, a probability of erroneously deciding that a communication route needs to be changed becomes high despite a fact that an abnormality requiring a change of the communication route has not occurred.

For example, when the master station 101, the subordinate station 102, or each wireless terminal device 202 decides erroneously that an abnormality occurs at the communication route, transmission of an RERR message, an RREQ message, and an RREP message occurs, and accordingly, the communication load in the wireless communication system 401 increases.

Accordingly, in the wireless communication system according to the first embodiment of the present invention, such a problem is solved by the following configuration and operation.

[Configuration of Master Station]

Figure 10:
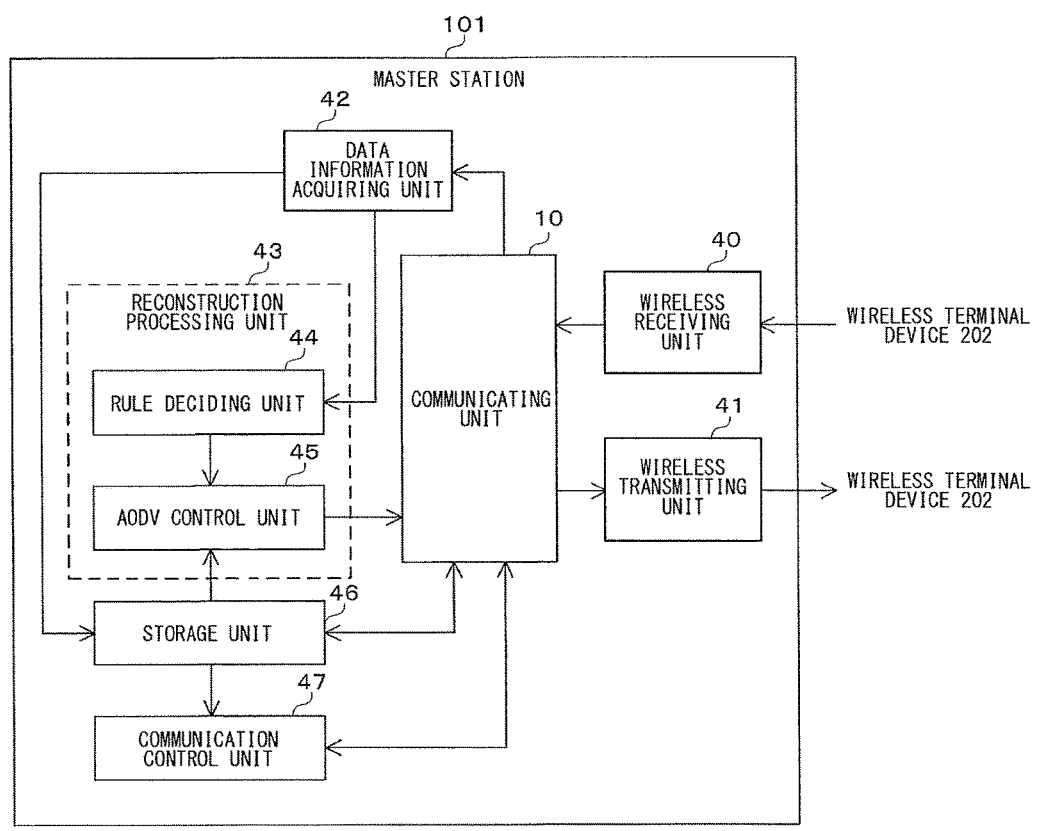
FIG. 10 is a diagram illustrating a configuration of a master station in a wireless communication system according to the first embodiment of the present invention.

FIG. 10 is a diagram illustrating a configuration of a master station in a wireless communication system according to the first embodiment of the present invention.

Referring to FIG. 10, the master station 101 includes a communicating unit 10, a wireless receiving unit 40, a wireless transmitting unit 41, a data information acquiring unit 42, a reconstruction processing unit 43, a storage unit 46, and a communication control unit 47. The reconstruction processing unit 43 includes a rule deciding unit 44, and an AODV control unit 45. The data information acquiring unit 42, the reconstruction processing unit 43, and the communication control unit 47 correspond to a part or a total of the application 11. The storage unit 46 corresponds to a part or a total of the database 17.

The wireless receiving unit 40 receives a wireless signal from the wireless terminal device 202, frequency-converts the received wireless signal into a base-band signal or an IF (Intermediate Frequency) signal, converts the frequency-converted signal into a digital signal, and outputs the digital signal to the communicating unit 10.

The wireless transmitting unit 41 converts a digital signal received from the communicating unit 10 into an analog signal, frequency converts the converted analog signal into a wireless signal, and transmits the wireless signal to the wireless terminal device 202.

The communicating unit 10 communicates with the subordinate station 102 via one or a plurality of wireless terminal devices 202, for example. Further, the communicating unit 10 acquires a communication route between the own master station 101 and the subordinate station 102, for example, and makes the storage unit 46 store the acquired communication route.

Upon receiving a TCP/IP packet from the subordinate station 102 via one or a plurality of wireless terminal devices 202, for example, the communicating unit 10 transmits ACK indicating the reception of the TCP/IP packet to the subordinate station 102.

The data information acquiring unit 42 acquires from the communicating unit 10 data information, for example, temperature information from the subordinate station 102, and makes the storage unit 46 store the acquired data information.

The data information acquiring unit 42 outputs acquisition completion information indicating a completion of the acquisition of data information, to the reconstruction processing unit 43 at the timing of acquiring the temperature information from the communicating unit 10, for example.

The storage unit 46 stores a route table and data information received from the data information acquiring unit 42, for example. In the route table, a communication route received from the communicating unit 10 is recorded. The storage unit 46 may be provided at the outside of the master station 101, for example.

The reconstruction processing unit 43 decides whether the communicating unit 10 performs communication with the subordinate station 102 in accordance with a predetermined rule. Specifically, the reconstruction processing unit 43 decides whether the communicating unit 10 is performing communication with the subordinate station 102 in accordance with the predetermined rule, based on the arrival state of a communication signal destined for the own master station 101 regularly transmitted from the subordinate station 102, for example. When a state against the predetermined rule occurs, for example, the reconstruction processing unit 43 performs a process of changing the communication route.

More specifically, when the communicating unit 10 receives data information in each predetermined cycle, for example, specifically at every 125 milliseconds, the rule deciding unit 44 in the reconstruction processing unit 43 decides that the communicating unit 10 communicates with the subordinate station 102 in accordance with a predetermined rule. When the communicating unit 10 does not receive data information at every 125 milliseconds, for example, the rule deciding unit 44 decides that the communicating unit 10 does not communicate with the subordinate station 102 in accordance with a predetermined rule.

Specifically, when the interval of a timing of receiving acquisition completion information from the data information acquiring unit 42 is 125 milliseconds, for example, the rule deciding unit 44 decides that the communicating unit 10 communicates with the subordinate station 102 in accordance with a predetermined rule.

When the interval of a timing of receiving acquisition completion information from the data information acquiring unit 42 is longer than 125 milliseconds or when the interval is shorter than 125 milliseconds, for example, the rule deciding unit 44 decides that the communicating unit 10 does not communicates with the subordinate station 102 in accordance with a predetermined rule. In this case, the rule deciding unit 44 outputs communication abnormality information indicating the occurrence of a state against the predetermined rule, to the AODV control unit 45, for example.

When the interval of a timing of receiving acquisition completion information from the data information acquiring unit 42 is shorter than the time obtained by adding a permissible time α to 125 milliseconds, for example, the rule deciding unit 44 may decide that the communicating unit 10 communicates with the subordinate station 102 in accordance with a predetermined rule.

The permissible time α is a delayed arrival time of data information assumed in the case of the occurrence of a congestion in the communication route from the subordinate station 102 to the master station 101, for example.

Accordingly, even when a congestion occurs at the communication route and the arrival timing of data information in the master station 101 is delayed, for example, the rule deciding unit 44 can reduce a possibility of erroneously deciding that a state against the predetermined rule occurs.

When a case that the interval of a timing of receiving acquisition completion information from the data information acquiring unit 42 is longer than 125 milliseconds or the interval is shorter than 125 milliseconds occurs at one time, the rule deciding unit 44 decides that the communicating unit 10 does not communicate with the subordinate station 102 in accordance with a predetermined rule. However, the decision is not limited to this. When a case that the interval is longer than 125 milliseconds or the interval is shorter than 125 milliseconds lasts at a plurality of times, for example, the rule deciding unit 44 may decide that the communicating unit 10 does not communicate with the subordinate station 102 in accordance with a predetermined rule.

Accordingly, the rule deciding unit 44 can correctly decide whether the communicating unit 10 performs communication with the subordinate station 102 in accordance with a predetermined rule.

Upon receiving communication abnormality information from the rule deciding unit 44, the AODV control unit 45 performs a process of changing the communication route, for example. Specifically, upon receiving communication abnormality information from the rule deciding unit 44, the AODV control unit 45 requests the subordinate station 102 to change the communication route, for example. More specifically, the AODV control unit 45 outputs to the AODV processing unit 16 in the communicating unit 10 illustrated in FIG. 2 the communication route changing instruction indicating broadcasting of the route search information destined for the subordinate station 102, for example.

Upon receiving the communication route changing instruction from the AODV control unit 45, the AODV processing unit 16 broadcasts the RREQ message including the IP address of the subordinate station 102 as the destination IP address.

The communication control unit 47 generates control information for changing a measuring condition of the sensor 37 in the subordinate station 102, based on data information such as temperature information held by the storage unit 46, and transmits the generated control information to the subordinate station 102 via the communicating unit 10, for example.

Further, when data information such as temperature information held by the storage unit 46 is in shortage, for example, the communication control unit 47 generates control information indicating a request for retransmission of the data information, and transmits the generated control information to the subordinate station 102 via the communicating unit 10.

[Configuration of Subordinate Station]

Figure 11:
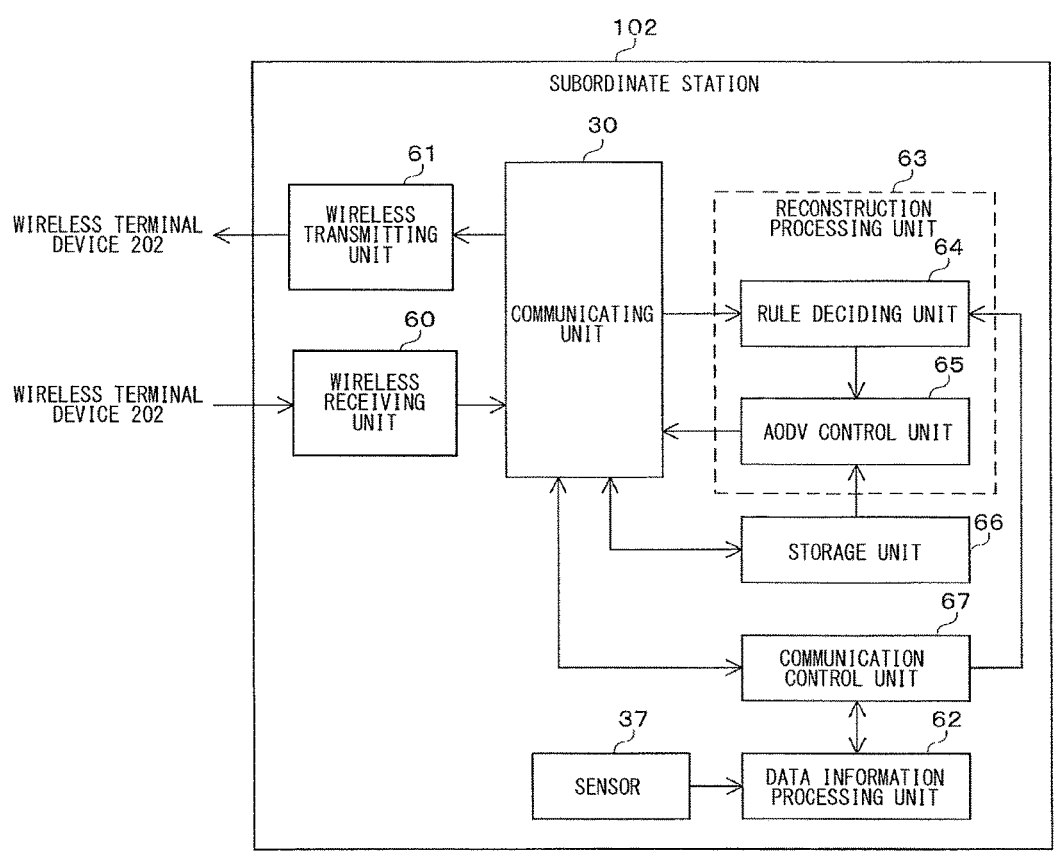
FIG. 11 is a diagram illustrating a configuration of a subordinate station in a wireless communication system according to the first embodiment of the present invention.

FIG. 11 is a diagram illustrating a configuration of a subordinate station in a wireless communication system according to the first embodiment of the present invention.

Referring to FIG. 11, the subordinate station 102 includes a communicating unit 30, a sensor 37, a wireless receiving unit 60, a wireless transmitting unit 61, a data information processing unit 62, a reconstruction processing unit 63, a storage unit 66, and a communication control unit 67. The reconstruction processing unit 63 includes a rule deciding unit 64, and an AODV control unit 65. The data information processing unit 62, the reconstruction processing unit 63, and the communication control unit 67 correspond to a part or a total of the application 31. The sensor 37 is similar to the sensor 37 illustrated in FIG. 2, and therefore, a detailed description will not be repeated.

The wireless receiving unit 60 receives a wireless signal from the wireless terminal device 202, frequency-converts the received wireless signal into a base-band signal or an IF (Intermediate Frequency) signal, converts the frequency-converted signal into a digital signal, and outputs the digital signal to the communicating unit 30.

The wireless transmitting unit 61 converts a digital signal received from the communicating unit 30 into an analog signal, frequency converts the converted analog signal into a wireless signal, and transmits the wireless signal to the wireless terminal device 202.

The communicating unit 30 communicates with the master station 101 via one or a plurality of wireless terminal devices 202, for example. Further, the communicating unit 30 acquires a communication route between the own subordinate station 102 and the master station 101, and makes the storage unit 66 store the acquired communication route.

The storage unit 66 stores a route table, for example. In the route table, a communication route received from the communicating unit 30 is recorded. The storage unit 66 may be provided at the outside of the subordinate station 102, for example.

The data information processing unit 62 generates temperature information from a temperature measured by the sensor 37, in the cycle of 125 milliseconds, and outputs the generated temperature information to the communication control unit 67 as data information, for example.

Upon receiving data information from the data information processing unit 62, for example, the communication control unit 67 outputs to the communicating unit 30 a request indicating a transmission of the received data information to the master station 101 in accordance with the TCP protocol. In this case, the communication control unit 67 outputs to the reconstruction processing unit 63 transmission completion information indicating that data information is transmitted to the master station 101.

Further, the communication control unit 67 acquires control information from the IP frame received from the communicating unit 30. The communication control unit 67 changes the measuring condition of the sensor 37 such as a measuring cycle, in accordance with the content of control information, and also, retransmits the data information such as temperature information to the master station 101, for example.

Upon receiving the request from the communication control unit 67, for example, the communicating unit 30 transmits the data information to the master station 101 via the wireless terminal device 202 in accordance with the TCP protocol. Then, upon receiving from the master station 101 via the wireless terminal device 202 ACK of the transmission of the data information, for example, the communicating unit 30 outputs to the reconstruction processing unit 63 ACK reception information indicating that the ACK is received.

The reconstruction processing unit 63 decides whether the communicating unit 30 performs communication with the master station 101 in accordance with a predetermined rule. Specifically, the reconstruction processing unit 63 decides whether the communicating unit 30 performs communication with the master station 101 in accordance with the predetermined rule, based on the arrival state of a communication signal destined for the own subordinate station 102 regularly transmitted from the master station 101, for example. When a state against the predetermined rule occurs, for example, the reconstruction processing unit 63 performs a process of changing the communication route.

More specifically, when the communicating unit 30 receives ACK of the data information within a predetermined time after receiving the data information, for example, the rule deciding unit 64 in the reconstruction processing unit 63 decides that the communicating unit 30 communicates with the master station 101 in accordance with a predetermined rule. When the communicating unit 30 has not received the ACK of the data information within a predetermined time after transmitting the data information, the rule deciding unit 64 decides that the communicating unit 30 does not communicate with the master station 101 in accordance with a predetermined rule.

Specifically, the rule deciding unit 64 measures a time from when the transmission completion information output by the communication control unit 67 is received until the ACK reception information output by the communicating unit 30 is received, for example. When the measuring time is within a predetermined time, for example, the rule deciding unit 64 decides that the communicating unit 30 communicates with the master station 101 in accordance with a predetermined rule.

Because the data information and the ACK of the data information are unicasted along the communication route, the predetermined time is set to a few dozens of milliseconds, for example.

When the measuring time exceeds a predetermined time, for example, the rule deciding unit 64 decides that the communicating unit 30 does not communicate with the master station 101 in accordance with a predetermined rule. In this case, the rule deciding unit 64 outputs to the AODV control unit 65 communication abnormality information indicating that a state against the predetermined rule occurs, for example.

When a measuring time is within a time obtained by adding a permissible time β to a predetermined time, for example, the rule deciding unit 64 may decide that the communicating unit 30 communicates with the master station 101 in accordance with a predetermined rule.

The permissible time β is, for example, a delayed arrival time of the data information and the ACK of the data information assumed when a congestion occurs at the communication route between the subordinate station 102 and the master station 101.

Accordingly, even when a congestion occurs at the communication route and the arrival timing of data information and ACK of the data information is delayed, for example, the rule deciding unit 64 can reduce a possibility of erroneously deciding that a state against the predetermined rule occurs.

When the case where the measuring time exceeds a predetermined time occurred at one time, the rule deciding unit 64 decided that the communicating unit 30 does not communicate with the master station 101 in accordance with a predetermined rule. However, the decision is not limited to this. For example, when the case where the measuring time exceeds a predetermined time occurred at a plurality of times, the rule deciding unit 64 may decide that the communicating unit 30 does not communicate with the master station 101 in accordance with a predetermined rule.

Accordingly, the rule deciding unit 64 can correctly decide whether the communicating unit 30 is performing communication with the master station 101 in accordance with a predetermined rule.

Upon receiving communication abnormality information from the rule deciding unit 64, the AODV control unit 65 performs a process of changing the communication route, for example. Specifically, upon receiving communication abnormality information from the rule deciding unit 64, the AODV control unit 65 requests the master station 101 to change the communication route, for example. More specifically, the AODV control unit 65 outputs to the AODV processing unit 36 in the communicating unit 30 illustrated in FIG. 2 a communication route changing instruction indicating that the route search information destined for the master station 101 is broadcast, for example.

Upon receiving the communication route changing instruction from the AODV control unit 65, the AODV processing unit 36 broadcasts the RREQ message including the IP address of the master station 101 as the destination IP address.

[Operation]

Next, the operation of each device in the wireless communication system according to the first embodiment of the present invention will be described with reference to the drawings.

The master station 101, the subordinate station 102, and each wireless terminal device 202 read each program including a part or a total of each step of the sequence illustrated below from a memory not illustrated, and execute the program. These programs can be installed from the outside.

[When Master Station Initiatively Performs Process of Changing Communication Route]

Figure 12:
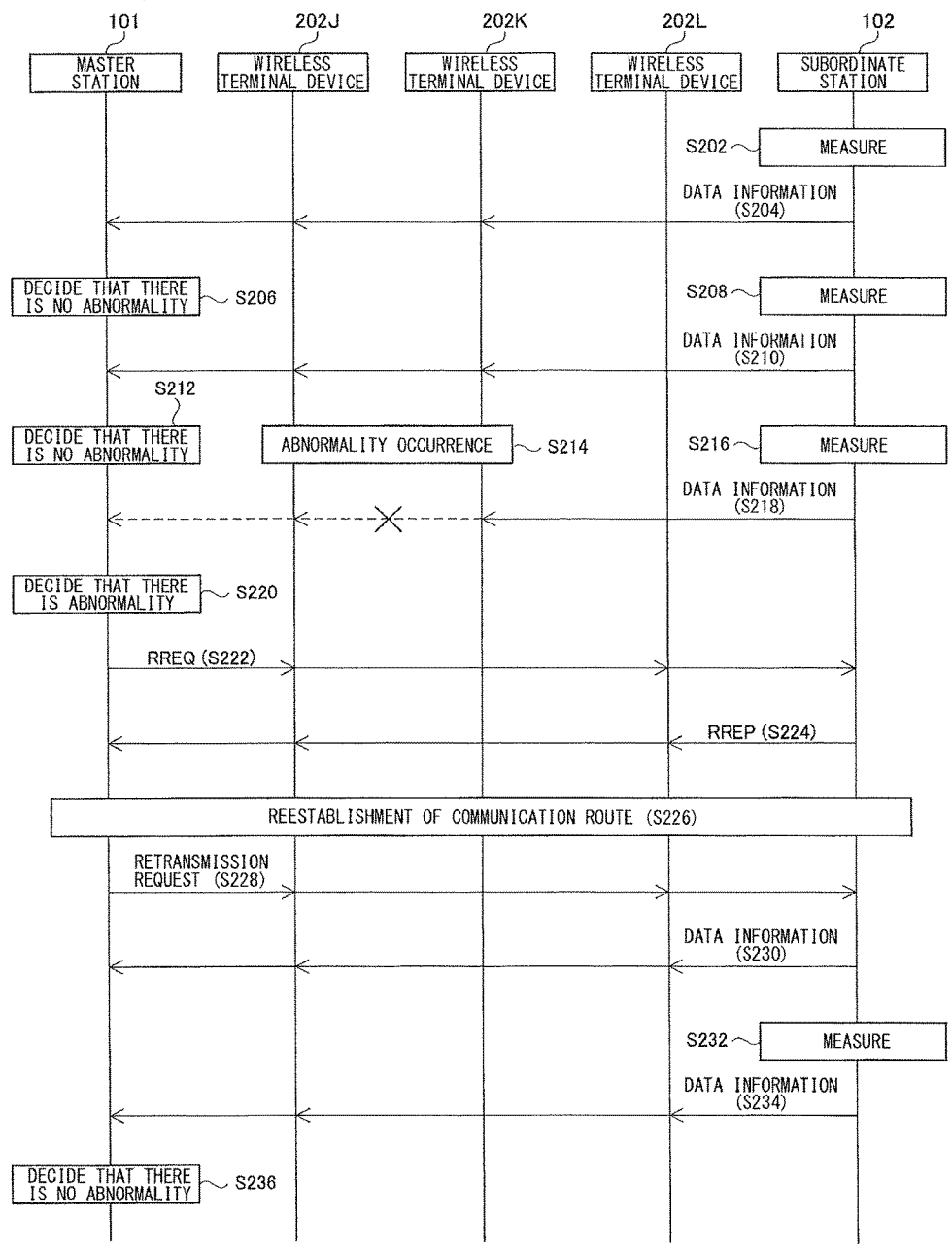
FIG. 12 is a diagram illustrating an example of a sequence when the master station initiatively performs a process of changing a communication route in the wireless communication system according to the first embodiment of the present invention.

FIG. 12 is a diagram illustrating an example of a sequence when the master station initiatively performs a process of changing a communication route in the wireless communication system according to the first embodiment of the present invention.

By referring to FIG. 12, there will be assumed a state that, between the master station 101 and the subordinate station 102, a communication route through the wireless terminal devices 202J and 202K has been established and that data information is cyclically transmitted from the subordinate station 102 to the master station 101. The wireless terminal devices 202J, 202K, and 202L are similar to the wireless terminal devices 202A to 202F. Hereinafter, each of the wireless terminal devices 202J, 202K, and 202L will be also referred to as the wireless terminal device 202.

First, the subordinate station 102 performs an N-th cycle temperature measurement in the temperature measurement of a 125 millisecond cycle, for example (Step S202).

Next, the subordinate station 102 generates temperature information including an N-th cycle measurement result as data information, and transmits the generated data information to the master station 101, at time ts1 as a transmission timing of a 125 millisecond cycle, for example. The data information is relayed by the wireless terminal devices 202K and 202J, and arrives at the master station 101, for example (Step S204).

Next, upon receiving data information from the subordinate station 102, the master station 101 decides whether the received data information is regularly transmitted from the subordinate station 102. Specifically, because the data information has been received from the subordinate station 102 at the 125 millisecond interval, for example, the application 11 in the master station 101 decides that the communicating unit 10 communicates with the subordinate station 102 in accordance with a predetermined rule, that is, the application 11 decides that there is no abnormality in the communication route (Step S206).

Next, the subordinate station 102 performs an (N+1)-th cycle temperature measurement in the temperature measurement of a 125 millisecond cycle, for example (Step S208).

Next, the subordinate station 102 generates temperature information including an (N+1)-th cycle measurement result as data information, and transmits the generated data information to the master station 101, at time ts2 after 125 milliseconds from time ts1, for example. The data information is relayed by the wireless terminal devices 202K and 202J, and arrives at the master station 101, for example (Step S210).

Next, the master station 101 receives data information from the subordinate station 102. In this case, because the data information has been received from the subordinate station 102 at the 125 millisecond interval, for example, the application 11 in the master station 101 decides that there is no abnormality in the communication route (Step S212).

Next, there occurs a state that communication cannot be performed between the wireless terminal devices 202J and 202K as a part of the communication route, for example (Step S214).

Next, the subordinate station 102 performs an (N+2)-th cycle temperature measurement in the temperature measurement of a 125 millisecond cycle, for example (Step S216).

Next, the subordinate station 102 generates temperature information including an (N+2)-th cycle measurement result as data information, and transmits the generated data information to the master station 101, at time ts3 after 125 milliseconds from time ts2, for example. However, because communication cannot be performed between the wireless terminal devices 202J and 202K, for example, the data information is abandoned by the wireless terminal device 202K after staying in the buffer of the wireless terminal device 202K (Step S218).

Next, the application 11 in the master station 101, for example, recognizes that the data information has not been received from the subordinate station 102 at the 125 millisecond interval, and decides that the communicating unit 10 is not communicating in accordance with a predetermined rule, that is, the application 11 decides that there is an abnormality in the communication route (Step S220).

Next, the application 11 in the master station 101 makes the communicating unit 10 broadcast the RREQ message as route search information destined for the subordinate station 102, for example. The RREQ message is relayed by each wireless terminal device 202 such as the wireless terminal devices 202J and 202L, for example, and arrives at the subordinate station 102. The subordinate station 102 receives an RREQ message in each route through which the RREQ message passed, for example (Step S222).

Next, upon receiving an RREQ message for each route, for example, the subordinate station 102 unicasts the RREP message as a response to the RREQ message received from the wireless terminal device 202L, to the wireless terminal device 202L. The RREP message is relayed by the wireless terminal devices 202L and 202J, and arrives at the master station 101, for example (Step S224).

Accordingly, between the master station 101 and the subordinate station 102, there is established a communication route through the wireless terminal devices 202J and 202L (Step S226).

Next, because the data information including the measurement result of the (N+2)-th cycle has not been received, for example, the application 11 in the master station 101 transmits a retransmission request for the data information to the subordinate station 102. The retransmission request is relayed by the wireless terminal devices 202J and 202L, and arrives at the subordinate station 102, for example (Step S228).

Upon receiving the retransmission request from the master station 101, for example, the subordinate station 102 retransmits the data information including the (N+2)-th cycle measurement result to the master station 101. The data information is relayed by the wireless terminal devices 202L and 202J, and arrives at the master station 101, for example (Step S230).

Next, the subordinate station 102 performs an (N+3)-th cycle temperature measurement in the temperature measurement of a 125 millisecond cycle, for example (Step S232).

Next, the subordinate station 102 generates temperature information including an (N+3)-th cycle measurement result as data information, and transmits the generated data information to the master station 101, at time ts4 after 125 milliseconds from time ts3, for example. The data information is relayed by the wireless terminal devices 202L and 202J, and arrives at the master station 101, for example (Step S234).

Next, the master station 101 receives data information from the subordinate station 102. In this case, because the data information excluding the data information including the (N+2)-th cycle measurement result has not been received from the subordinate station 102 at the 125 millisecond interval, for example, the application 11 in the master station 101 decides that there is no abnormality in the communication route (Step S236).

Regarding the occurrence of a state that the master station 101 and the subordinate station 102 cannot communicate (Step S214), in the case of detecting by using the hello message and the RERR message as illustrated in FIG. 6, for example, the time from the occurrence of the state until the master station 101 and the subordinate station 102 recognize the state becomes the following time. That is, when the transmission cycle of a hello message is ten seconds and also the permissible number of times of reception loss of a hello message is two, for example, the time is about 10 seconds to 20 seconds.

On the other hand, because the data information has not been received from the subordinate station 102 at the 125 millisecond interval in Step S220, the application 11 in the master station 101 recognizes the occurrence of a state that communication cannot be performed. The time from the occurrence of a state that communication cannot be performed until the master station 101 detects the abnormality is less than 125 milliseconds.

That is, by the configuration of detecting an abnormality of communication occurred in the wireless communication system 401, based on the data information cyclically received by the application 11 in the master station 101, the time from the occurrence of an abnormality of the communication until the master station 101 detects the abnormality can be shortened, as compared with the time by the configuration of detecting the abnormality of the communication by using the hello message and the RERR message.

Accordingly, the master station 101 can promptly detect a necessity for changing the communication route, and perform the change.

Further, in the wireless communication system 401, because the hello message and the RERR message for detecting the abnormality of communication occurred in the communication route can be made unnecessary, the load of communication in the wireless communication system 401 can be reduced.

[When Subordinate Station Initiatively Performs Process of Changing Communication Route]

Figure 13:
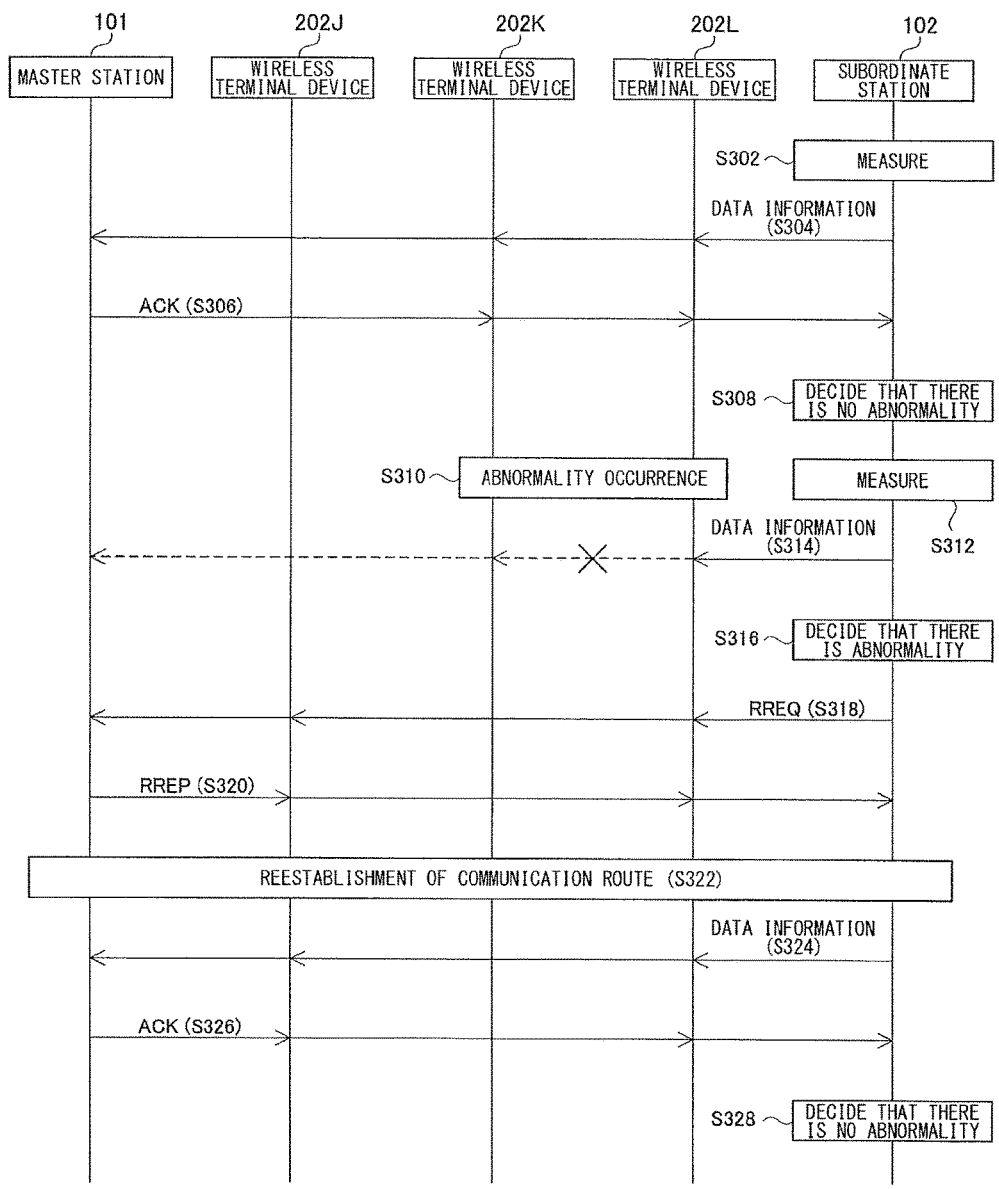
FIG. 13 is a diagram illustrating an example of a sequence when the subordinate station initiatively performs a process of changing a communication route in the wireless communication system according to the first embodiment of the present invention.

FIG. 13 is a diagram illustrating an example of a sequence when the subordinate station initiatively performs a process of changing a communication route in the wireless communication system according to the first embodiment of the present invention.

By referring to FIG. 13, there will be assumed a state that, between the master station 101 and the subordinate station 102, a communication route through the wireless terminal devices 202K and 202L has been established and that bidirectional communication is performed. Specifically, after transmitting data information to the master station 101 in accordance with the TCP protocol, the subordinate station 102 receives the ACK of the data information.

First, the subordinate station 102 performs an M-th temperature measurement, for example (Step S302).

Next, the subordinate station 102 transmits temperature information including an M-th measurement result to the master station 101 as data information, for example. The data information is relayed by the wireless terminal devices 202L and 202K, and arrives at the master station 101, for example (Step S304).

Upon receiving data information from the subordinate station 102, the master station 101 transmits ACK indicating the reception of the data information to the subordinate station 102. The ACK is relayed by the wireless terminal devices 202K and 202L, and arrives at the subordinate station 102, for example (Step S306).

Next, the subordinate station 102 decides whether ACK has been regularly received from the master station 101. Specifically, because the ACK of the data information has been received within a predetermined time after transmitting the data information to the master station 101, for example, the application 31 in the subordinate station 102 decides that the communicating unit 30 communicates with the master station 101 in accordance with a predetermined rule, that is, the application 31 decides that there is no abnormality in the communication route (Step S308).

Next, there occurs a state that communication cannot be performed between the wireless terminal devices 202L and 202K as a part of the communication route (Step S310).

Further, the subordinate station 102 performs an (M+1)-th temperature measurement, for example (Step S312).

Next, the subordinate station 102 transmits temperature information including an (M+1)-th measurement result to the master station 101 as data information, for example. However, because communication cannot be performed between the wireless terminal devices 202L and 202K, for example, the data information is abandoned by the wireless terminal device 202L after staying in the buffer of the wireless terminal device 202L (Step S314).

Next, the application 31 in the subordinate station 102 recognizes that the ACK of the data information has not been received within a predetermined time after transmitting the data information to the master station 101, and decides that the communicating unit 30 is not communicating in accordance with a predetermined rule, that is, the application 31 decides that there is an abnormality in the communication route, for example (Step S316).

Next, the application 31 in the subordinate station 102 makes the communicating unit 30 broadcast the RREQ message as route search information destined for the master station 101, for example. The RREQ message is relayed by each wireless terminal device 202 such as the wireless terminal devices 202L and 202J, and arrives at the master station 101, for example. The master station 101 receives an RREQ message in each route through which the RREQ message passed, for example (Step S318).

Next, upon receiving an RREQ message for each route, for example, the master station 101 unicasts the RREP message as a response to the RREQ message received from the wireless terminal device 202J, to the wireless terminal device 202J. The RREP message is relayed by the wireless terminal devices 202J and 202L, and arrives at the subordinate station 102, for example (Step S320).

Accordingly, between the subordinate station 102 and the master station 101, there is established a communication route through the wireless terminal devices 202L and 202J (Step S322).

Next, because the subordinate station 102 has decided that there is an abnormality in the communication route, for example, the subordinate station 102 retransmits the temperature information including the (M+1)-th measurement result to the master station 101 as data information. The data information is relayed by the wireless terminal devices 202L and 202J, and arrives at the master station 101, for example (Step S324).

Upon receiving data information from the subordinate station 102, the master station 101 transmits ACK indicating the reception of the data information to the subordinate station 102. The ACK is relayed by the wireless terminal devices 202J and 202L, and arrives at the subordinate station 102, for example (Step S326).

Next, the subordinate station 102 receives the ACK from the master station 101, for example. In this case, because the ACK of the data information has been received within a predetermined time after transmitting the data information to the master station 101, for example, the application 31 in the subordinate station 102 decides that there is no abnormality in the communication route (Step S328).

Regarding the occurrence of a state that the subordinate station 102 and the master station 101 cannot communicate (Step S310), in the case of detecting by using the hello message and the RERR message as illustrated in FIG. 6, for example, the time from the occurrence of the state until the subordinate station 102 and the master station 101 recognize the state becomes about 10 seconds to 20 seconds as described above.

On the other hand, because the ACK of the data information has not been received within a predetermined time after transmitting the data information to the master station 101 in Step S316, the application 31 in the subordinate station 102 recognizes the occurrence of a state that communication cannot be performed. The time from the occurrence of a state that communication cannot be performed until the subordinate station 102 detects the abnormality is the time shorter than the interval of a timing when the subordinate station 102 transmits data information, the time shorter than 125 milliseconds, for example.

That is, by the configuration of detecting an abnormality of communication occurring at the wireless communication system 401, based on the ACK regularly received after the application 31 in the subordinate station 102 transmits data information to the master station 101, the time from the occurrence of an abnormality of the communication until the subordinate station 102 detects the abnormality can be shortened, as compared with the time by the configuration of detecting the abnormality of the communication by using the hello message and the RERR message.

Accordingly, the subordinate station 102 can promptly detect a necessity for changing the communication route, and perform the change.

Further, in the wireless communication system 401, because the hello message and the RERR message for detecting the abnormality of communication occurred in the communication route can be made unnecessary, the load of communication in the wireless communication system 401 can be reduced.

Figure 14:
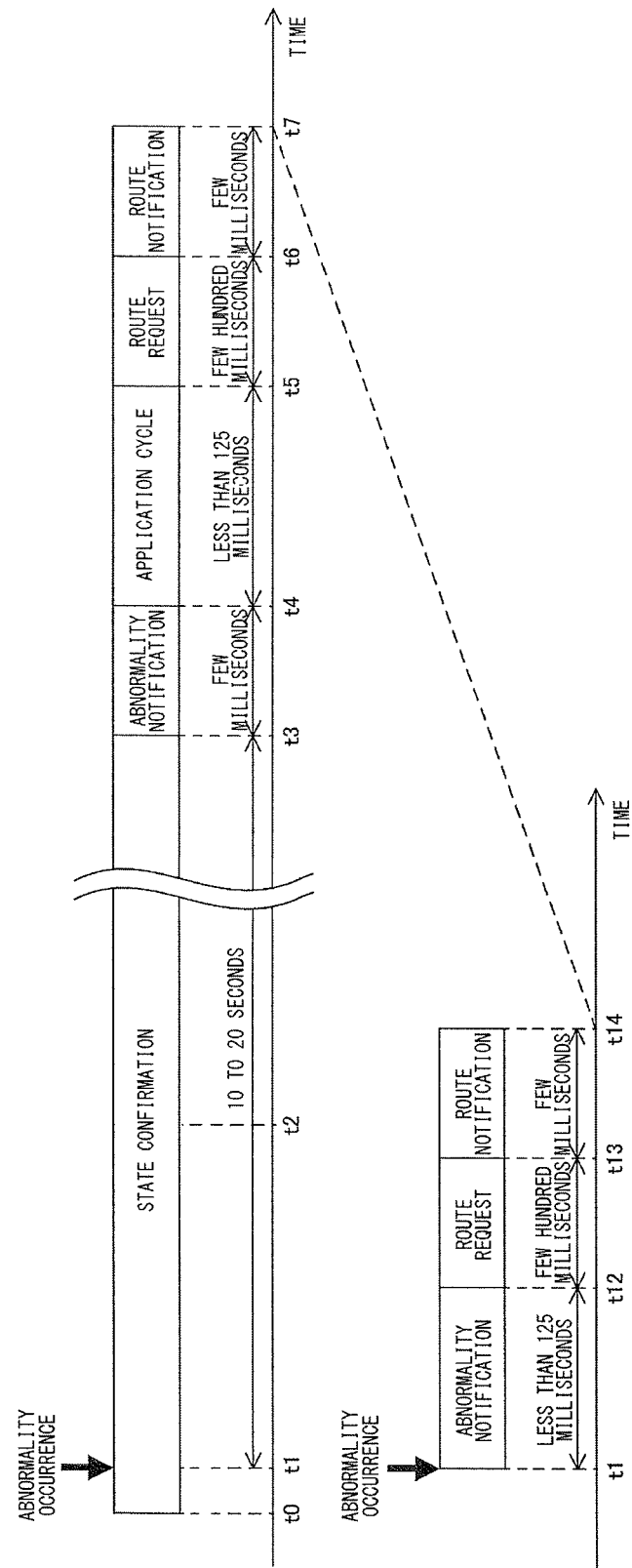
FIG. 14 is a diagram illustrating an example of a shortening result of a time required for the master station or the subordinate station to change a communication route relative to a comparative example illustrated in FIG. 9, when an abnormality occurs at the communication route, according to the first embodiment of the present invention.

FIG. 14 is a diagram illustrating an example of a shortening result of a time required for the master station or the subordinate station to change a communication route relative to a comparative example illustrated in FIG. 9, when an abnormality occurs at the communication route, according to the first embodiment of the present invention.

Referring to FIG. 14, the time required for "abnormality detection" is, for example, the time from when an abnormality of the communication occurs on the communication route at time t1 until the master station 101 or the subordinate station 102 detects the abnormality at time t12.

Specifically, the time required for "abnormality detection" by the master station 101 is, for example, a time shorter than the time obtained by adding a permissible time α to 125 milliseconds as a reception cycle of data information received from the subordinate station 102. For example, when the permissible time α is set to 50 milliseconds, the time required for "abnormality detection" is less than 175 milliseconds.

The time required for "abnormality detection" by the subordinate station 102 is a time shorter than an interval of timing when the subordinate station 102 transmits data information, for example, a time obtained by adding a permissible time β to 125 milliseconds. For example, when the permissible time β is set to 50 milliseconds, the time required for "abnormality detection" becomes less than 175 milliseconds.

Because "route request" and "route notification" are similar to "route request" and "route notification" respectively illustrated in FIG. 9, a brief description will be made.

The time required for "route request" from time t12 to time t13 is, for example, a time from when the master station 101 or the subordinate station 102 broadcasts an RREQ message until the subordinate station 102 or the master station 101 respectively receives the RREQ message. The time required for "route request" is specifically a few dozens of milliseconds to a few hundred milliseconds.

The time required for "route notification" from time t13 to time t14 is, for example, a time from when the master station 101 or the subordinate station 102 transmits an RREP message by unicast until the subordinate station 102 or the master station 101 respectively receives the RREP message and a new communication route is established. The time required for "route notification" is specifically a few milliseconds.

Therefore, the time from the occurrence of an abnormality in the communication route in the wireless communication system 401 at time t1 until the establishment of a new communication route at time t14 is a few hundred milliseconds.

That is, when an abnormality occurs at the communication route, a time longer than ten seconds is necessary in the process of changing the communication route according to the AODV protocol. However, the time necessary for the process of changing the communication route can be shortened to a few hundred milliseconds.

[Simulation]

Figure 15:
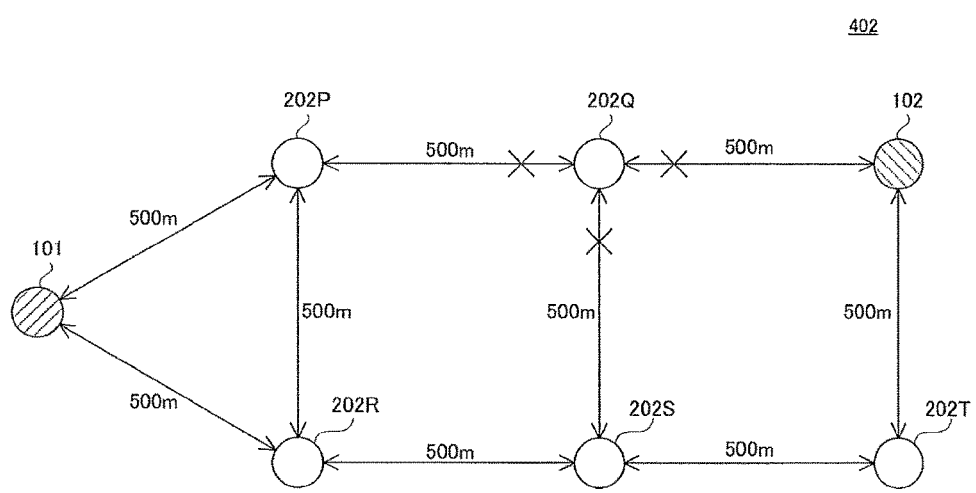
FIG. 15 is a diagram illustrating an outline of simulation which is a model of a process of changing a communication route in the wireless communication system according to the first embodiment of the present invention.

FIG. 15 is a diagram illustrating an outline of simulation which is a model of a process of changing a communication route in the wireless communication system according to the first embodiment of the present invention.

Referring to FIG. 15, a wireless communication system 402 modeling a wireless communication system 401 includes the master station 101, the subordinate station 102, and wireless terminal devices 202P, 202Q, 202R, 202S, and 202T.

The subordinate station 102 is arranged at a position 500 meters away from the wireless terminal device 202Q. The wireless terminal device 202P is arranged at a diametrically opposite position of the subordinate station 102 relative to the wireless terminal device 202Q.

The wireless terminal device 202T is arranged at a position 500 meters away from the subordinate station 102, in a direction of 90 degrees to the left when the wireless terminal device 202Q is looked at from the subordinate station 102.

The wireless terminal device 202S is arranged at a position 500 meters away from the wireless terminal device 202Q, in a direction of 90 degrees to the left when the wireless terminal device 202P is looked at from the wireless terminal device 202Q.

The wireless terminal device 202R is arranged at a position 500 meters away from the wireless terminal device 202P, in a direction of 90 degrees to the right when the wireless terminal device 202Q is looked at from the wireless terminal device 202P.

The master station 101 is arranged at a position 500 meters away from the wireless terminal device 202P, in a direction of 150 degrees to the right when the wireless terminal device 202Q is looked at from the wireless terminal device 202P.

In the simulation, there will be assumed a state that the master station 101, the subordinate station 102, and the wireless terminal devices 202P, 202Q, 202R, 202S, and 202T transmit and receive a packet in both directions in a cycle of 125 milliseconds.

The simulation is performed in the following procedure. That is, (1) transmission start timings of packets of the master station 101, the subordinate station 102, and the wireless terminal devices 202P, 202Q, 202R, 202S, and 202T are determined by random numbers. (2) The master station 101 receives packets from the subordinate station 102 via the wireless terminal devices 202Q and 202P until time t=30 seconds. (3) The wireless terminal device 202Q becomes in a fault and becomes unable to communicate at time t=30 seconds.

Figure 16:
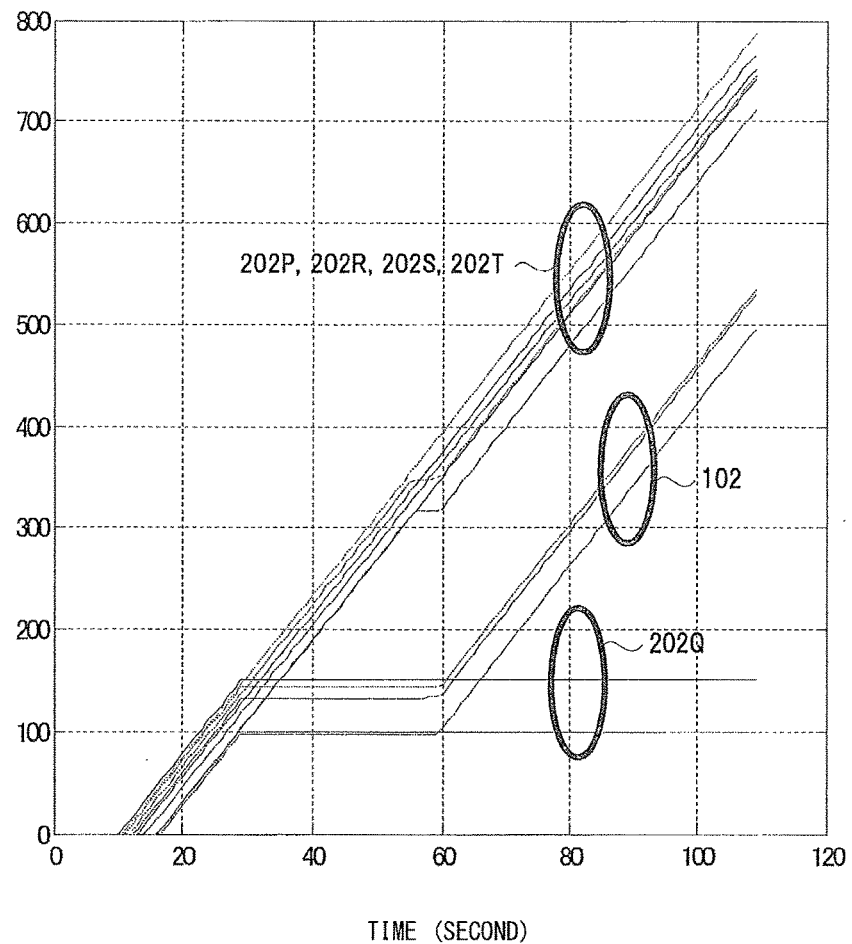
FIG. 16 is a diagram illustrating an example of a time change of the number of packets reaching the master station in the case of detecting an abnormality of a communication route by using a hello message and an RERR message in the simulation illustrated in FIG. 15.

FIG. 16 is a diagram illustrating an example of a time change of the number of packets reaching the master station in the case of detecting an abnormality of a communication route by using a hello message and an RERR message in the simulation illustrated in FIG. 15.

Referring to FIG. 16, the number of arrived packets in the vertical axis is calculated at every one second, for example. The master station 101 receives packets from the subordinate station 102 and the wireless terminal devices 202P, 202Q, 202R, 202S, and 202T at the rate of about eight packets per second from the transmission start timing determined by random numbers to time t=30 seconds.

Then, the master station continuously receives packets at the rate of about eight packets from the wireless terminal devices 202P, 202R, 202S, and 202T, after time t=30 seconds. The reason why the reception rate of packets does not change is that the packets that the master station 101 receives from the wireless terminal devices 202P, 202R, 202S, and 202T are not via the wireless terminal device 202Q.

Further, after time t=30 seconds, the master station 101 becomes unable to receive packet from the wireless terminal device 202Q that became in the fault.

Further, after time t=30 seconds until time t=58 seconds, because a communication route between the master station 101 and the subordinate station 102 is reconstructed by using a hello message and an RERR message, the master station 101 cannot receive a packet from the subordinate station 102. After time t=58 seconds, the master station 101 receives packets from the subordinate station 102 by using the reconstructed communication route, that is the communication route from the subordinate station 102 through the wireless terminal devices 202T, 202S, and 202R.

As described above, about 28 seconds are taken from the occurrence of a fault in the wireless terminal device 202Q until the master station 101 becomes able to receive packets from the subordinate station 102.

Figure 17:
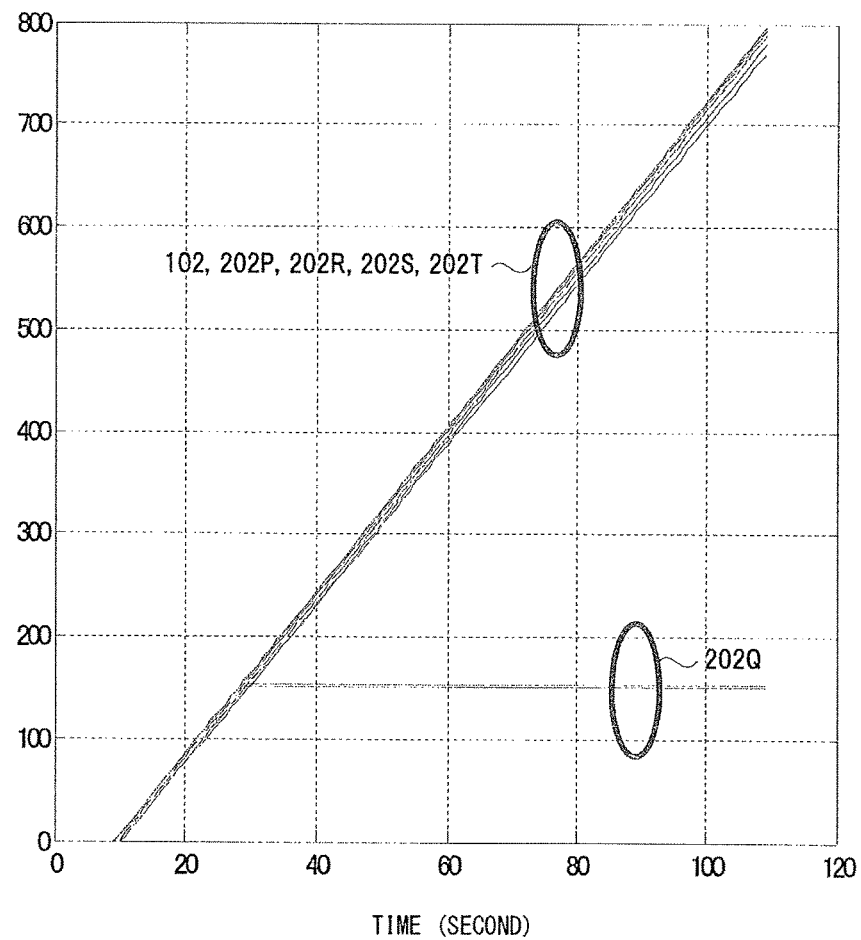
FIG. 17 is a diagram illustrating an example of a time change of the number of packets reaching the master station when an application in the master station or an application in the subordinate station detects an abnormality of a communication route in the simulation illustrated in FIG. 15.

FIG. 17 is a diagram illustrating an example of a time change of the number of packets reaching the master station when an application in the master station or an application in the subordinate station detects an abnormality of a communication route in the simulation illustrated in FIG. 15.

Referring to FIG. 17, the number of arrived packets in the vertical axis is calculated at every one second, for example. The master station 101 receives packets from the subordinate station 102 and the wireless terminal devices 202P, 202Q, 202R, 202S, and 202T at the rate of about eight packets per second from the transmission start timing determined by random numbers to time t=30 seconds.

Then, after time t=30 seconds, the master station 101 becomes unable to receive packet from the wireless terminal device 202Q that became in the fault.

Further, the master station continuously receives packets at the rate of about eight packets from the subordinate station 102 and the wireless terminal devices 202P, 202R, 202S, and 202T, after time t=30 seconds.

Figure 18:
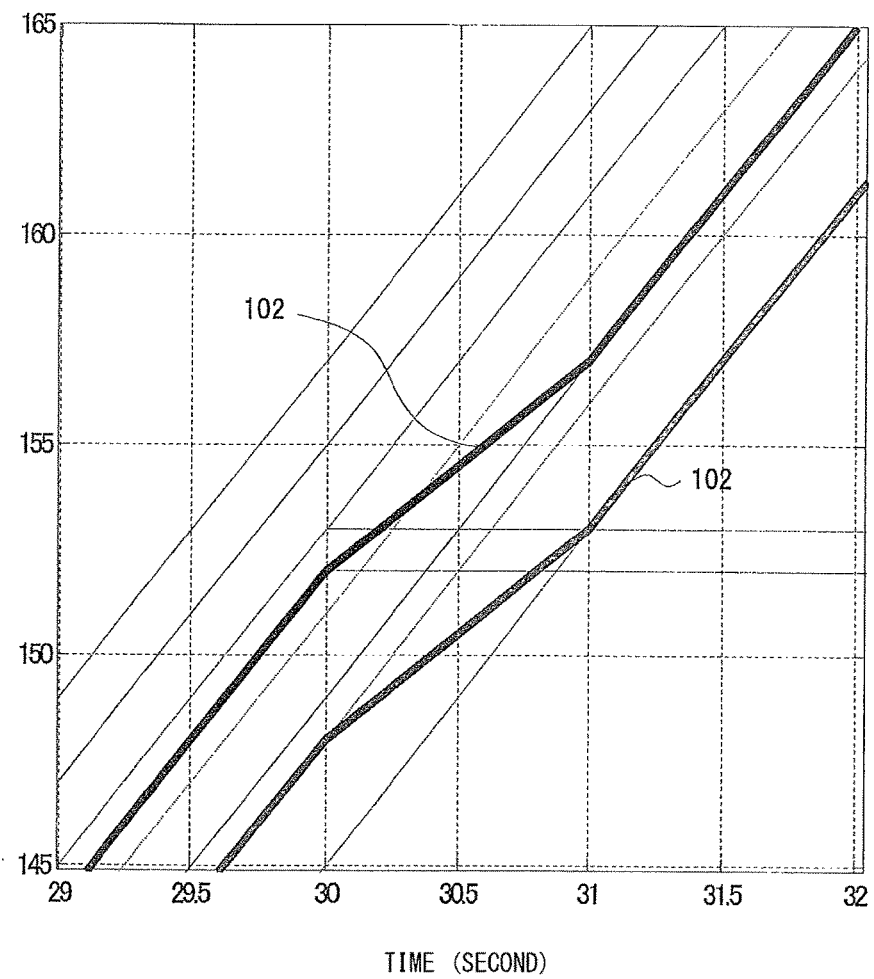
FIG. 18 is an enlarged diagram of a change in the number of arrived packets at time t=29 to 32 seconds, in a simulation result illustrated in FIG. 17.

FIG. 18 is an enlarged diagram of a change in the number of arrived packets at time t=29 to 32 seconds, in a simulation result illustrated in FIG. 17.

Referring to FIG. 18, the master station 101 receives packets from the wireless terminal devices 202P, 202R, 202S, and 202T at the rate of about eight packets per second from time t=29 seconds to t=32 seconds.

Further, the master station 101 receives packets from the subordinate station 102 at the rate of about eight packets per second from time t=29 seconds to t=30 seconds. The master station 101 receives packets from the subordinate station 102 at the rate of about five packets per second from t=30 seconds to t=31 seconds. Then, the master station 101 receives packets from the subordinate station 102 at the rate of about eight packets per second after time t=31 again.

According to a result of the simulation, reconstruction of the communication route between the master station 101 and the subordinate station 102 is completed at a timing of about 300 milliseconds after time t=30 seconds. Therefore, a reception rate of packets that the master station 101 receives from the subordinate station 102 becomes lower from about eight packets per second to about five packets per second from time t=30 seconds to t=31 seconds.

More specifically, at time t=30.000 seconds, the wireless terminal device 202Q becomes in a fault. At time t=30.090 seconds, the subordinate station 102 detects the abnormality of the communication route based on that packets cannot be received from the master station 101, and broadcasts an RREQ message. At time t=30.158 seconds, the wireless terminal device 202T broadcasts the RREQ message received from the subordinate station 102. At time t=30.228 seconds, the wireless terminal device 202S broadcasts the RREQ message received from the wireless terminal device 202T. At time t=30.278 seconds, the wireless terminal device 202R broadcasts the RREQ message received from the wireless terminal device 202S. At time t=30.308 seconds, the master station 101 receives the RREQ message from the wireless terminal device 202R, and unicasts an RREP message as a response to the received RREQ message, to the wireless terminal device 202R. At time t=30.309 seconds, the wireless terminal device 202R unicasts the RREP message received from the master station 101, to the wireless terminal device 202S. At time t=30.310 seconds, the wireless terminal device 202S unicasts the RREP message received from the wireless terminal device 202R, to the wireless terminal device 202T. At time t=30.311 seconds, the wireless terminal device 202T unicasts the RREP message received from the wireless terminal device 202S, to the subordinate station 102. At time t=30.312 seconds, the subordinate station 102 receives the RREP message from the wireless terminal device 202T. Then, between the master station 101 and the subordinate station 102, there is established a communication route through the wireless terminal devices 202R, 202S, and 202T.

As described above, time T1 required to detect the abnormality of the communication route is 90 milliseconds. Time T2 required to transmit the RREQ message by broadcast is 218 milliseconds. Time T3 required to transmit the RREP message by unicast is four milliseconds.

That is, time Ts=T1+T2+T3 from the detection of the abnormality of a communication route to the establishment of the communication route is 312 milliseconds. Out of time Ts, proportion of time occupied by T1, T2, and T3 are 29%, 70%, and 1%, respectively. Therefore, by unicasting the RREQ message without broadcasting the RREQ message, time Ts can be shortened.

[Modification]

According to the wireless ad hoc network standardized by RFC 3561 (refer to Non-Patent Literature 2), the communication route is established and changed according to a communication state between each wireless terminal device 202 and a position of each wireless terminal device 202, for example.

For example, between the master station 101 and the subordinate station 102, when a position of each wireless terminal device 202 that relays the IP packet or the message is fixed, by the following configuration, the master station 101, the subordinate station 102, and each wireless terminal device 202 establish and change the communication route without broadcasting the RREQ message.

Referring to FIG. 1 again, in the route table in the master station 101, the subordinate station 102, and the wireless terminal devices 202A to 202F in the wireless communication system 401, a destination IP address of an IP packet and a next hop IP address of the IP packet are recorded in advance by relating to each other, for example.

More specifically, in a storage unit 46 in the master station 101 illustrated in FIG. 10, a plurality of kinds of communication routes are recorded in advance, for example. Specifically, in the route table in the storage unit 46, the IP address of the subordinate station 102 as a destination IP address and the IP addresses of the wireless terminal devices 202D, 202E, and 202F as next hop IP addresses are recorded in advance by relating to each other, for example.

In the next hop IP addresses, priorities may be given in advance in the order of the IP address of the wireless terminal device 202E, the IP address of the wireless terminal device 202D, and the IP address of the wireless terminal device 202F, for example.

For example, in the storage unit 66 in the subordinate station 102 illustrated in FIG. 11, a plurality of kinds of communication routes are recorded in advance. Specifically, in the route table in the storage unit 66, the IP address of the master station 101 as a destination IP address and the IP addresses of the wireless terminal devices 202A, 202B, and 202C as next hop IP addresses are recorded in advance by relating to each other, for example.

In the next hop IP addresses, priorities may be given in advance in the order of the IP address of the wireless terminal device 202B, the IP address of the wireless terminal device 202A, and the IP address of the wireless terminal device 202C, for example.

In the route table in the wireless terminal devices 202A to 202F, the IP address of the master station 101 or the IP address of the subordinate station 102 as a destination IP address and the next hop IP address of the IP packet destined for the master station 101 or the subordinate station 102 are recorded in advance by relating to each other, for example.

[Establishment of Communication Route]

The subordinate station 102 generates an RREQ message including the IP address of the master station 101 as a destination IP address and the own IP address as an originator IP address, to establish a communication route to the master station 101, for example. Then, the subordinate station 102 refers to the route table in the storage unit 66, and unicasts the generated RREQ message to the wireless terminal device 202B, for example.

Upon receiving the RREQ message from the subordinate station 102, the wireless terminal device 202B unicasts the RREQ message to the wireless terminal device 202E, based on the destination IP address included in the RREQ message and the route table held by the self.

Upon receiving the RREQ message from the subordinate station 202B, the wireless terminal device 202E unicasts the RREQ message to the master station 101, based on the destination IP address included in the RREQ message and the route table held by the self.

Upon receiving the RREQ message from the wireless terminal device 202E, the master station 101 generates the RREP message destined for the subordinate station 102 to notify the subordinate station 102 of the communication route, based on the originator IP address included in the RREQ message and the route table held by the self. Then, the master station 101 refers to the route table in the storage unit 46, and unicasts the generated RREP message to the wireless terminal device 202E, for example.

Thereafter, the RREP message is transmitted to the subordinate station 102 by unicast via the wireless terminal devices 202E and 202B, as illustrated in FIG. 4. Then, between the master station 101 and the subordinate station 102, there is established a communication route through the wireless terminal devices 202B and 202E.

[When Subordinate Station Detects Abnormality of Communication Route]

For example, when the subordinate station 102 transmits temperature information as data information to the master station 101 in accordance with the TCP protocol, there occurs a state that communication cannot be performed between the master station 101 and the wireless terminal device 202E.

Because the rule deciding unit 64 in the subordinate station 102 illustrated in FIG. 11 has not received within a predetermined time the ACK of the transmitted data information, for example, the rule deciding unit 64 decides that the communicating unit 30 does not communicate with the master station 101 in accordance with a predetermined rule, and outputs communication abnormality information to the AODV control unit 65.

Upon receiving communication abnormality information from the rule deciding unit 64, the AODV control unit 65 selects a new communication route from among a plurality of kinds of communication routes stored in the storage unit 66, for example. Specifically, the AODV control unit 65 refers to the route table in the storage unit 66, and selects the IP address of the wireless terminal device 202A having a second priority as the next hop IP address, for example.

Then, the AODV control unit 65 outputs to the communicating unit 30 as the route information the IP address of the master station 101 as a destination and the IP address of the wireless terminal device 202A selected as the next hop IP address, for example.

The communicating unit 30 communicates with the master station 101 by using the route information received from the AODV control unit 65, for example. Specifically, in order to change the communication route to the master station 101, for example, the communicating unit 30 generates an RREQ message including the IP address of the master station 101 as a destination IP address and the own IP address as an originator IP address. Then, the communicating unit 30 unicasts the generated RREQ message to the wireless terminal device 202A, for example.

The RREQ message is transmitted to the master station 101 by unicast via the wireless terminal devices 202A and 202D. Then, the master station 101 unicasts the RREP message as a response to the RREQ message, to the wireless terminal device 202D.

The RREP message is transmitted to the subordinate station 102 by unicast via the wireless terminal devices 202D and 202A. Then, the communication route between the subordinate station 102 and the master station 101 is changed to the communication route through the wireless terminal devices 202A and 202D.

[When Master Station Detects Abnormality of Communication Route]

For example, when the master station 101 receives temperature information as data information from the subordinate station 102 at every 125 milliseconds, there occurs a state that communication cannot be performed between the master station 101 and the wireless terminal device 202E.

Because the communicating unit 10 does not receive data information at every 125 milliseconds, for example, the rule deciding unit 44 in the master station 101 illustrated in FIG. 10 decides that the communicating unit 10 does not communicate with the subordinate station 102 in accordance with a predetermined rule, and outputs communication abnormality information to the AODV control unit 45.

Upon receiving communication abnormality information from the rule deciding unit 44, the AODV control unit 45 selects a new communication route from among a plurality of kinds of communication routes stored in the storage unit 46, for example. Specifically, the AODV control unit 45 refers to the route table in the storage unit 46, and selects the IP address of the wireless terminal device 202D having a second priority as the next hop IP address, for example.

Then, the AODV control unit 45 outputs to the communicating unit 10 as route information the IP address of the subordinate station 102 as a destination and the IP address of the wireless terminal device 202D selected as the next hop IP address, for example.

The communicating unit 10 communicates with the subordinate station 102 by using the route information received from the AODV control unit 45, for example. Specifically, in order to change the communication route to the subordinate station 102, for example, the communicating unit 10 generates an RREQ message including the IP address of the subordinate station 102 as a destination IP address and the own IP address as an originator IP address. Then, the communicating unit 10 unicasts the generated RREQ message to the wireless terminal device 202D, for example.

The RREQ message is transmitted to the subordinate station 102 by unicast via the wireless terminal devices 202D and 202A. Then, the subordinate station 102 unicasts the RREP message as a response to the RREQ message, to the wireless terminal device 202A.

The RREP message is transmitted to the master station 101 by unicast via the wireless terminal devices 202A and 202D. Then, the communication route between the master station 101 and the subordinate station 102 is changed to the communication route through the wireless terminal devices 202D and 202A.

In the case of exchanging packets between the communication devices via the wireless ad hoc network, the packets are transferred between the communication devices through the communication route through one or a plurality of wireless terminal devices for performing a relay of the packets.

For example, when an abnormality such as a fault of a wireless terminal device and a communication failure occurs at the communication route, a wireless terminal device that detects the abnormality notifies the occurrence of the abnormality to a communication device. The communication device recognizes the occurrence of the abnormality in the communication route, based on the notification from the wireless terminal device, and starts construction of a new communication route.

However, there is a case where the time from the occurrence of the abnormality until the recognition of the abnormality by the communication device becomes long in the communication route. In this case, between the communication devices, the time during which the packets cannot be exchanged becomes long.

On the other hand, in the master station 101 according to the first embodiment of the present invention, the communicating unit 10 can communicate with the subordinate station 102 using the communication route through one or a plurality of wireless terminal devices 202, and communicates with the subordinate station 102 in accordance with a predetermined rule. When a state against the predetermined rule occurs, the reconstruction processing unit 43 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the master station 101, the time taken from the occurrence of the abnormality in the communication route to when the master station 101 recognizes the abnormality can be shortened. Therefore, the period during which IP packets cannot be transmitted and received between the master station 101 and the subordinate station 102 can be shortened.

Further, in the master station 101 according to the first embodiment of the present invention, the reconstruction processing unit 43 decides whether to perform the process of changing the communication route, based on the arrival state of data information destined for the own master station 101 regularly transmitted from the subordinate station 102.

By using such a configuration, based on the arrival state of the data information, the occurrence of a state against the predetermined rule can be recognized easily and promptly. Therefore, whether to perform the process of changing the communication route can be decided efficiently.

In the master station 101 according to the first embodiment of the present invention, the reconstruction processing unit 43 broadcasts the RREQ message as route search information destined for the subordinate station 102 for determining a new communication route.

By using such a configuration, even when the master station 101 does not understand a communication route to the subordinate station 102, because the RREQ message is transmitted to the subordinate station 102, the process to be performed by the master station 101 can be simplified.

Further, because the RREQ message is transmitted to the subordinate station 102 via a plurality of communication routes, the subordinate station 102 can select a proper communication route from the plurality of communication routes through which the received RREQ message passed.

Further, by the unicast transfer to the master station 101 from the subordinate station 102 of the RREP message as a response to the RREQ message corresponding to the communication route selected by the subordinate station 102, a new communication route between the master station 101 and the subordinate station 102 can be established.

In the master station 101 according to the first embodiment of the present invention, the storage unit 46 stores a plurality of kinds of communication routes. When a state against the predetermined rule occurs, the reconstruction processing unit 43 selects a new communication route from among a plurality of kinds of communication routes stored in the storage unit 46. The communicating unit 10 communicates with the subordinate station 102 by using the communication route selected by the reconstruction processing unit 43.

In this way, by the configuration of establishing a new communication route by activating the communication route stored in advance, as compared with the configuration of dynamically establishing a new communication route by using the broadcast RREQ message, the time required from the occurrence of a state against the predetermined rule until the establishment of a new communication route can be shortened. Therefore, transmission and reception of an IP packet can be restarted at an early stage.

The master station 101 according to the first embodiment of the present invention operates in accordance with the protocol having a plurality of layers. The communicating unit 10 communicates by processing a communication layer including the TCP layer, the IP layer, the MAC layer, and the PHY layer of a lower order than that of the application layer out of the plurality of layers. The reconstruction processing unit 43 performs a process of changing the communication route, by performing a process for the application layer of a higher order than the communication layer out of the plurality of layers.

By using such a configuration, information about the abnormality of a communication route detected by the application layer can be used for the process for the communication layer. Therefore, as compared with the configuration in which the communication layer singly detects the abnormality of the communication route regardless of the process for the application layer, the communication route can be changed by detecting the necessity for the change at an early stage.

Further, because exchanges of information such as a hello message and an RERR message for the communication layer to singly detect the abnormality of the communication route can be made unnecessary, a total load of the wireless communication system 401 configured by the master station 101, the subordinate station 102, and one or a plurality of wireless terminal devices 202 can be reduced.

In the communication system according to the first embodiment of the present invention, the plurality of wireless terminal devices 202 can relay the communication. The master station 101 can communicate with the subordinate station 102 using the communication route through one or a plurality of wireless terminal devices 202, and communicates with the subordinate station 102 in accordance with a predetermined rule. When a state against a predetermined rule occurs, the master station 101 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the master station 101, the time taken from the occurrence of the abnormality in the communication route to when the master station 101 recognizes the abnormality can be shortened. Therefore, the period during which IP packets cannot be transmitted and received between the master station 101 and the subordinate station 102 can be shortened.

Further, in the communication system according to the first embodiment of the present invention, the master station 101 decides whether to perform the process of changing the communication route, based on the arrival state of data information destined for the own master station 101 regularly transmitted from the subordinate station 102.

By using such a configuration, based on the arrival state of the data information, the occurrence of a state against the predetermined rule can be recognized easily and promptly. Therefore, whether to perform the process of changing the communication route can be decided efficiently.

Further, in the communication system according to the first embodiment of the present invention, upon detecting the occurrence of a state against the predetermined rule, the master station 101 requests the subordinate station 102 to change the communication route. Upon receiving a request from the master station 101, the subordinate station 102 determines a new communication route.

By using such a configuration, even when the subordinate station 102 cannot detect the occurrence of a state against the predetermined rule, for example, a necessity for changing the communication route between the master station 101 and the subordinate station 102 can be promptly detected and the change can be performed.

That is, in the communication between the master station 101 and the subordinate station 102, when at least the master station 101 has a function of detecting the occurrence of a state against the predetermined rule, a necessity for changing the communication route between the master station 101 and the subordinate station 102 can be promptly detected and the change can be performed. That is, because the configuration of the subordinate station 102 can be simplified, a total cost of the communication system can be reduced.

Further, for example, even when the subordinate station 102 cannot detect the occurrence of a state against the predetermined rule, the subordinate station 102 can recognize the occurrence of a state against the predetermined rule by receiving a request from the master station 101, and accordingly, a necessary process can be performed.

In the communication system according to the first embodiment of the present invention, the master station 101 broadcasts the RREQ message as route search information destined for the subordinate station 102 for determining a new communication route. The subordinate station 102 or the wireless terminal device 202 determines a new communication route, based on the RREQ message received via one or a plurality of kinds of communication routes.

By using such a configuration, even when the master station 101 does not understand a communication route to the subordinate station 102, because the RREQ message is transmitted to the subordinate station 102, the process to be performed by the master station 101 can be simplified.

Further, because the RREQ message is transmitted to the subordinate station 102 or the wireless terminal device 202 having a communication route to the subordinate station 102 via a plurality of communication routes, the subordinate station 102 or the wireless terminal device 202 can select a proper communication route from the plurality of communication routes through which the received RREQ message passed.

Further, by the unicast transfer from the subordinate station 102 or the wireless terminal device 202 to the master station 101 of the RREP message as a response to the RREQ message corresponding to the communication route selected by the subordinate station 102 or the wireless terminal device 202, a new communication route between the master station 101 and the subordinate station 102 can be established.

Further, in the subordinate station 102 according to the first embodiment of the present invention, the communicating unit 30 can communicate with the master station 101 using the communication route through one or a plurality of wireless terminal devices 202, and communicates with the master station 101 in accordance with a predetermined rule. When a state against the predetermined rule occurs, the reconstruction processing unit 63 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the subordinate station 102, the time taken from the occurrence of the abnormality in the communication route to when the subordinate station 102 recognizes the abnormality can be shortened. Therefore, the period during which IP packets cannot be transmitted and received between the subordinate station 102 and the master station 101 can be shortened.

Further, in the subordinate station 102 according to the first embodiment of the present invention, the reconstruction processing unit 63 decides whether to perform the process of changing the communication route, based on the arrival state of ACK destined for the own subordinate station 102 regularly transmitted from the master station 101.

By using such a configuration, based on the arrival state of the ACK, the occurrence of a state against the predetermined rule can be recognized easily and promptly. Therefore, whether to perform the process of changing the communication route can be decided efficiently.

In the subordinate station 102 according to the first embodiment of the present invention, the reconstruction processing unit 63 broadcasts the RREQ message as route search information destined for the master station 101 for determining a new communication route.

By using such a configuration, even when the subordinate station 102 does not understand a communication route to the master station 101, because the RREQ message is transmitted to the master station 101, the process to be performed by the subordinate station 102 can be simplified.

Further, because the RREQ message is transmitted to the master station 101 via a plurality of communication routes, the master station 101 can select a proper communication route from the plurality of communication routes through which the received RREQ message passed.

Further, by the unicast transfer from the master station 101 to the subordinate station 102 of the RREP message as a response to the RREQ message corresponding to the communication route selected by the master station 101, a new communication route between the subordinate station 102 and the master station 101 can be established.

In the subordinate station 102 according to the first embodiment of the present invention, the storage unit 66 stores a plurality of kinds of communication routes. When a state against a predetermined rule occurs, the reconstruction processing unit 63 selects a new communication route from among a plurality of kinds of communication routes stored in the storage unit 66. The communicating unit 30 communicates with the master station 101 by using the communication route selected by the reconstruction processing unit 63.

In this way, by the configuration of establishing a new communication route by activating the communication route stored in advance, as compared with the configuration of dynamically establishing a new communication route by using the broadcast RREQ message, the time required from the occurrence of a state against the predetermined rule until the establishment of a new communication route can be shortened. Therefore, transmission and reception of an IP packet can be restarted at an early stage.

The subordinate station 102 according to the first embodiment of the present invention operates in accordance with the protocol having a plurality of layers. The communicating unit 30 communicates by processing a communication layer including the TCP layer, the IP layer, the MAC layer, and the PHY layer of a lower order than that of the application layer out of the plurality of layers. The reconstruction processing unit 63 performs a process of changing the communication route, by performing a process for the application layer of a higher order than the communication layer out of the plurality of layers.

By using such a configuration, information about the abnormality of a communication route detected by the application layer can be used for the process for the communication layer. Therefore, as compared with the configuration in which the communication layer singly detects the abnormality of the communication route regardless of the process for the application layer, the communication route can be changed by detecting the necessity for the change at an early stage.

Further, because exchanges of information such as a hello message and an RERR message for the communication layer to singly detect the abnormality of the communication route can be made unnecessary, a total load of the wireless communication system 401 configured by the master station 101, the subordinate station 102, and one or a plurality of wireless terminal devices 202 can be reduced.

In the communication system according to the first embodiment of the present invention, the plurality of wireless terminal devices 202 can relay the communication. The subordinate station 102 can communicate with the master station 101 using the communication route through one or a plurality of wireless terminal devices 202, and communicates with the master station 101 in accordance with a predetermined rule. When a state against the predetermined rule occurs, the subordinate station 102 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the subordinate station 102, the time taken from the occurrence of the abnormality in the communication route to when the subordinate station 102 recognizes the abnormality can be shortened. Therefore, the period during which IP packets cannot be transmitted and received between the subordinate station 102 and the master station 101 can be shortened.

Further, in the communication system according to the first embodiment of the present invention, the subordinate station 102 decides whether to perform the process of changing the communication route, based on the arrival state of ACK destined for the own subordinate station 102 regularly transmitted from the master station 101.

By using such a configuration, based on the arrival state of the ACK, the occurrence of a state against the predetermined rule can be recognized easily and promptly. Therefore, whether to perform the process of changing the communication route can be decided efficiently.

Further, in the communication system according to the first embodiment of the present invention, upon detecting the occurrence of a state against the predetermined rule, the subordinate station 102 requests the master station 101 to change the communication route. Upon receiving a request from the subordinate station 102, the master station 101 determines a new communication route.

By using such a configuration, even when the master station 101 cannot detect the occurrence of a state against the predetermined rule, for example, a necessity for changing the communication route between the subordinate station 102 and the master station 101 can be promptly detected and the change can be performed.

That is, in the communication between the subordinate station 102 and the master station 101, when at least the subordinate station 102 has a function of detecting the occurrence of a state against the predetermined rule, a necessity for changing the communication route between the subordinate station 102 and the master station 101 can be promptly detected and the change can be performed. That is, because the configuration of the master station 101 can be simplified, a total cost of the communication system can be reduced.

Further, even when the master station 101 cannot detect the occurrence of the state against a predetermined rule, for example, the master station 101 can recognize the occurrence of a state against the predetermined rule by receiving a request from the subordinate station 102, and accordingly, a necessary process can be performed.

In the communication system according to the first embodiment of the present invention, the subordinate station 102 broadcasts the RREQ message as route search information destined for the master station 101 for determining a new communication route. The master station 101 or the wireless terminal device 202 determines a new communication route, based on the RREQ message received via one or a plurality of kinds of communication routes.

By using such a configuration, even when the subordinate station 102 does not understand a communication route to the master station 101, because the RREQ message is transmitted to the master station 101, the process to be performed by the subordinate station 102 can be simplified.

Further, because the RREQ message is transmitted to the master station 101 or the wireless terminal device 202 having a communication route to the master station 101 via a plurality of communication routes, the master station 101 or the wireless terminal device 202 can select a proper communication route from the plurality of communication routes through which the received RREQ message passed.

Further, by the unicast transfer from the master station 101 or the wireless terminal device 202 to the subordinate station 102 of the RREP message as a response to the RREQ message corresponding to the communication route selected by the master station 101 or the wireless terminal device 202, a new communication route between the subordinate station 102 and the master station 101 can be established.

In the wireless communication system 401 according to the first embodiment of the present invention, the communication route in which information is transmitted from the master station 101 to the subordinate station 102 and the communication route in which communication is transmitted from the subordinate station 102 to the master station 101 are equal to each other. However, the wireless communication system 401 is not limited to this configuration. For example, the communication route in which information is transmitted from the master station 101 to the subordinate station 102 and the communication route in which communication is transmitted from the subordinate station 102 to the master station 101 may be different.

Further, although the wireless communication system 401 according to the first embodiment of the present invention is configured to include the wireless ad hoc network standardized by RFC 3561 (refer to Non-Patent Literature 2), the configuration is not limited to this. The wireless communication system 401 may be configured to include the wireless ad hoc network standardized by RFC 3626 (refer to Non-Patent Literature 3), for example.

Next, another embodiment of the present invention will be described with reference to the drawings. The same or corresponding parts in the drawings will be attached with the same symbols, and their explanation will not be repeated.

Second Embodiment

The embodiment relates to a communication device that does not configure a wireless ad hoc network as compared with the communication device according to the first embodiment. The content other than that described below is similar to that of the communication device according to the first embodiment.

(Configuration and Basic Operation)

Figure 19:
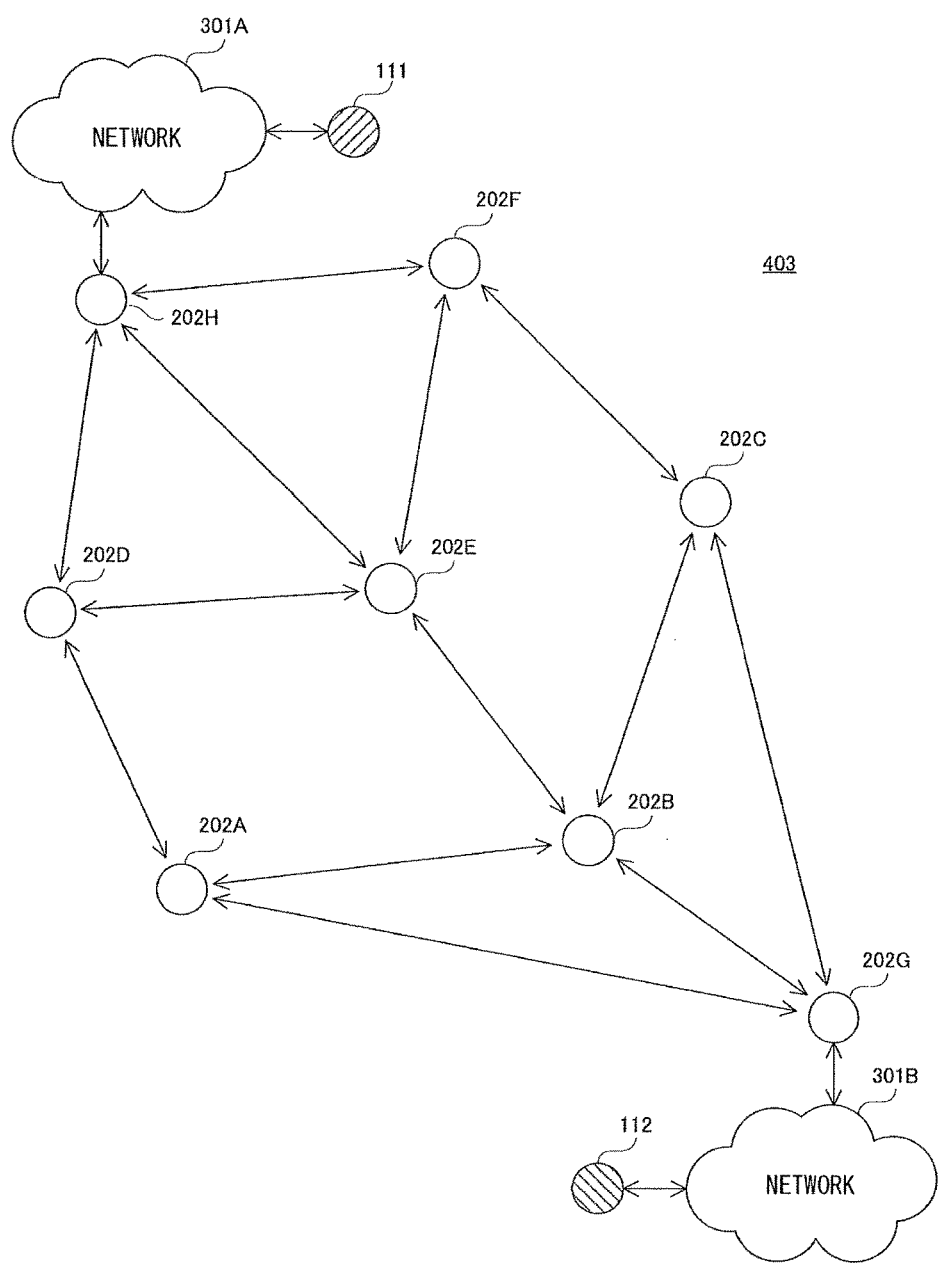
FIG. 19 is a diagram illustrating a configuration of a wireless communication system according to a second embodiment of the present invention.

FIG. 19 is a diagram illustrating a configuration of a wireless communication system according to a second embodiment of the present invention.

Referring to FIG. 19, as compared with the wireless communication system 401 according to the first embodiment, a wireless communication system (communication system) 403 further includes wireless terminal devices 202G and 202H, includes a master station 111 (communication device) and a subordinate station 112 (communication device) in place of the master station 101 and the subordinate station 102, respectively, and further includes networks 301A and 301B.

Hereinafter, each of the wireless terminal devices 202A to 202H will be also referred to as the wireless terminal device 202. Each of the networks 301A and 301B will be also referred to as the network 301. In FIG. 19, eight wireless terminal devices 202 are representatively illustrated. However, the wireless communication system 403 may be configured to include a smaller number or a larger number of the wireless terminal devices 202.

The network 301 includes one or a plurality of routers, for example. The router routes IP packets transmitted and received between the master station 111, the subordinate station 112, and the wireless terminal devices 202, in accordance with the IP protocol.

The wireless terminal device 202 can exchange information by wireless communication with another wireless terminal device 202 positioned in the vicinity. Specifically, for example, the wireless terminal device 202H can exchange information by wireless communication with wireless terminal devices 202D, 202E, and 202F positioned in the vicinity. Further, for example, the wireless terminal device 202G can exchange information by wireless communication with wireless terminal devices 202A, 202B, and 202C positioned in the vicinity.

The master station 111 and the subordinate station 112 can exchange information with the wireless terminal device 202 via the network 301, for example. Specifically, the master station 111 can exchange information with the wireless terminal device 202H via the network 301A, for example. Specifically, the subordinate station 112 can exchange information with the wireless terminal device 202G via the network 301B, for example.

The master station 111 communicates with the subordinate station 112 by using a communication route through one or a plurality of wireless terminal devices 202, for example. Specifically, the master station 111 communicates with the subordinate station 112 by using a communication route through the network 301A, the wireless terminal devices 202H, 202E, 202B, and 202G, and the network 301B, for example. In this case, the wireless terminal devices 202H, 202E, 202B, and 202G relay the information exchanged between the master station 111 and the subordinate station 112.

The communication route to be used to exchange information between the master station 111 and the subordinate station 112 is not limited to the communication route through the wireless terminal devices 202H, 202E, 202B, and 202G. The communication route to be used to exchange information between the master station 111 and the subordinate station 112 may be a communication route other than the communication route through the wireless terminal devices 202H, 202E, 202B, and 202G.

Figure 20:
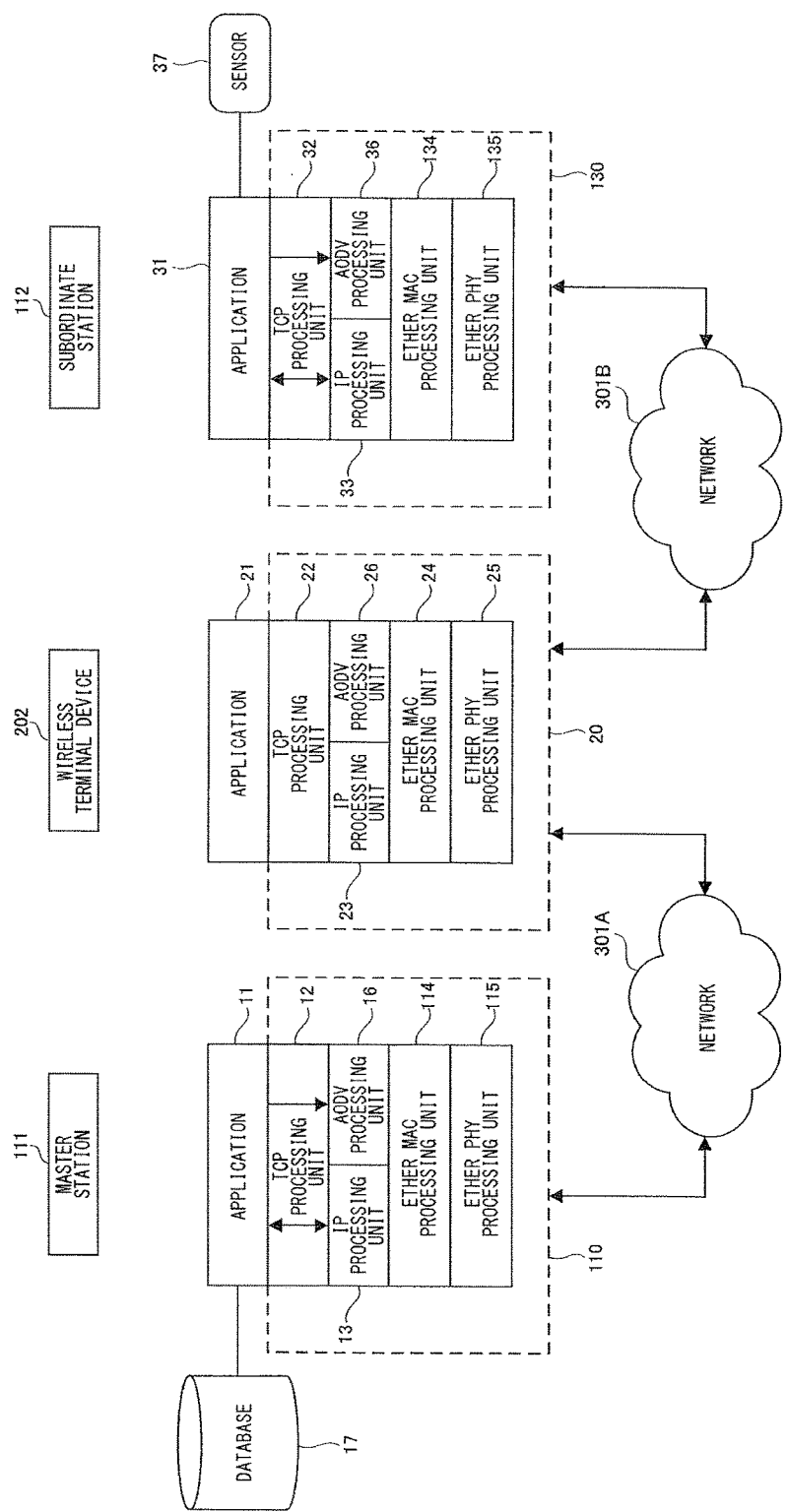
FIG. 20 is a diagram illustrating an example of a software configuration and management control of each device in the wireless communication system according to the second embodiment of the present invention.

FIG. 20 is a diagram illustrating an example of a software configuration and management control of each device in the wireless communication system according to the second embodiment of the present invention.

[Master Station]

Referring to FIG. 20, the master station 111 includes a communicating unit 110 in place of the communicating unit 10, as compared with the master station 101 according to the first embodiment. As compared with the communicating unit 10 according to the first embodiment, the communicating unit 110 includes an Ether MAC processing unit 114 and an Ether PHY processing unit 115 in place of the WiFi MAC processing unit 14 and the WiFi PHY processing unit 15, respectively.

The Ether MAC processing unit 114 performs a process for the MAC layer lower than the IP layer. The Ether PHY processing unit 115 performs a process for the PHY layer lower than the MAC layer.

The communicating unit 110 receives a communication signal from the subordinate station 112 via the network 301B, the wireless terminal device 202 and the network 301A, converts the received communication signal into an IP frame, and outputs the IP frame to the application 11, for example.

The application 11 acquires data information such as temperature information from the IP frame received from the communicating unit 110, and holds the acquired data information in the database 17, for example.

The application 11 generates control information for controlling the subordinate station 112, based on the information held in the database 17. Then, the application 11 sets an IP address of the subordinate station 112 as a destination IP address of the generated control information, and requests the communicating unit 110 to transmit the control information.

Upon receiving a transmission request for the control information from the application 11, the communicating unit 110 transmits the control information to the subordinate station 112 via the network 301A, the wireless terminal device 202, and the network 301B.

[Subordinate Station]

The subordinate station 112 includes a communicating unit 130 in place of the communicating unit 30, as compared with the subordinate station 102 according to the first embodiment. As compared with the communicating unit 30 according to the first embodiment, the communicating unit 130 includes an Ether MAC processing unit 134 and an Ether PHY processing unit 135 in place of the WiFi MAC processing unit 34 and the WiFi PHY processing unit 35, respectively.

The Ether MAC processing unit 134 performs a process for the MAC layer lower than the IP layer. The Ether PHY processing unit 135 performs a process for the PHY layer lower than the MAC layer.

The communicating unit 130 receives a communication signal from the master station 111 via the network 301A, the wireless terminal device 202 and the network 301B, converts the received communication signal into an IP frame, and outputs the IP frame to the application 31, for example.

The application 31 acquires control information from the IP frame received from the communicating unit 130, and makes the own subordinate station 112 perform the operation in accordance with the control information.

Further, the application 31 sets an IP address of the master station 111 as a destination IP address of cyclically generated data information, and requests the communicating unit 130 to transmit the data information, for example.

Upon receiving a transmission request for the data information from the application 31, the communicating unit 130 transmits the data information to the master station 111 via the network 301B, the wireless terminal device 202, and the network 301A.

[Configuration of Master Station]

Figure 21:
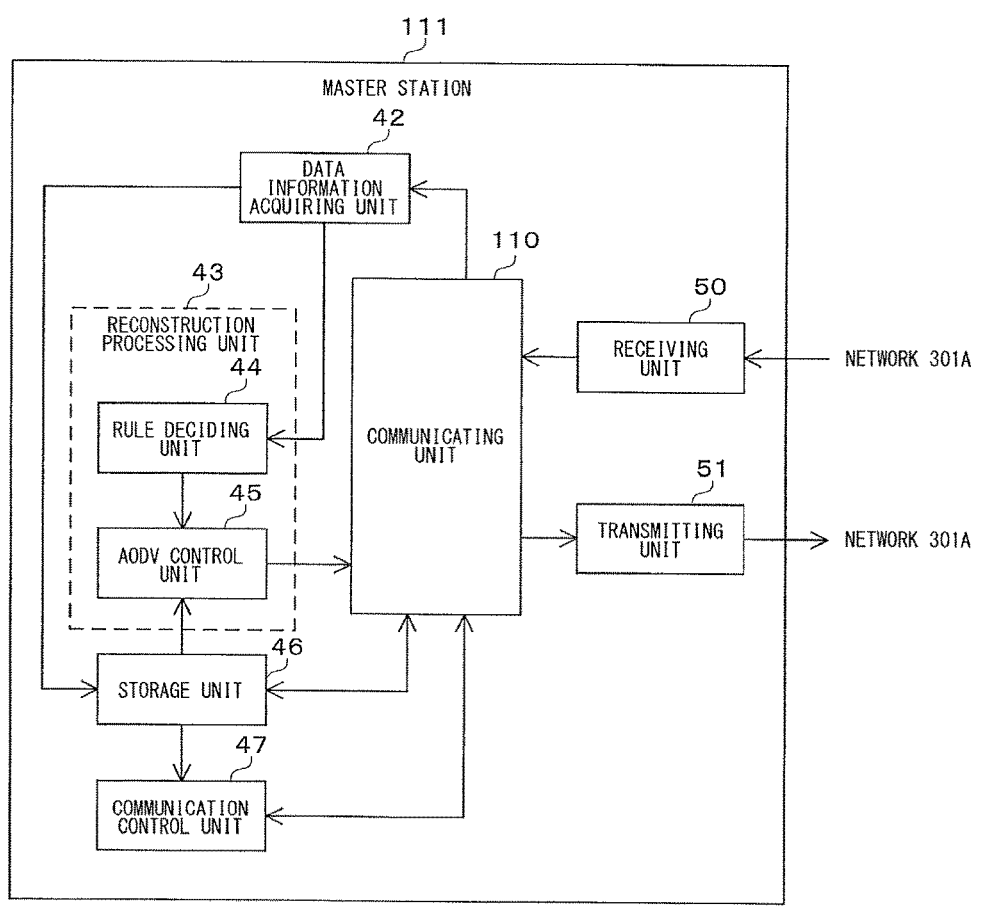
FIG. 21 is a diagram illustrating a configuration of a master station in the wireless communication system according to the second embodiment of the present invention.

FIG. 21 is a diagram illustrating a configuration of a master station in the wireless communication system according to the second embodiment of the present invention.

Referring to FIG. 21, as compared with the master station 101 according to the first embodiment, the master station 111 includes a communicating unit 110, a receiving unit 50, and a transmitting unit 51 in place of the communicating unit 10, the wireless receiving unit 40, and the wireless transmitting unit 41.

The receiving unit 50 receives an optical signal from the network 301A, converts the received optical signal into an electrical signal, and outputs the electrical signal to the communicating unit 110, for example.

The transmitting unit 51 converts the electrical signal and the like received from the communicating unit 110 into an optical signal, for example, and transmits the optical signal to the network 301A.

The communicating unit 110 communicates with the subordinate station 112 via the network 301A, the wireless terminal device 202, and the network 301B, for example. Further, the communicating unit 110 acquires a communication route between the own master station 111 and the subordinate station 112, and makes the storage unit 46 store the acquired communication route.

In the storage unit 46, there are recorded in advance the IP address of the wireless terminal device 202H that relays information to be exchanged between the wireless ad hoc network and the network 301A, and the IP address of the wireless terminal device 202G that relays information to be exchanged between the wireless ad hoc network and the network 301B, for example.

Upon receiving communication abnormality information from the rule deciding unit 44, the AODV control unit 45 in the reconstruction processing unit 43 performs a process of changing the communication route, for example. Specifically, upon receiving communication abnormality information from the rule deciding unit 44, for example, the AODV control unit 45 requests the subordinate station 112 or the wireless terminal device 202G to change the communication route. More specifically, the AODV control unit 45 acquires from the storage unit 46 the IP address of the subordinate station 112 or the wireless terminal device 202G as a destination IP address of the RREQ message, for example.

The AODV control unit 45 outputs to the AODV processing unit 16 in the communicating unit 110 illustrated in FIG. 20 a communication route changing instruction indicating to broadcast the route search information destined for the subordinate station 112 or the wireless terminal device 202G, for example. The communication route changing instruction includes the IP address of the subordinate station 112 or the wireless terminal device 202G, for example.

Upon receiving a communication route changing instruction from the AODV control unit 45, for example, the AODV processing unit 16 broadcasts a RREQ message including the IP address of the subordinate station 112 or the wireless terminal device 202G as a destination IP address, based on the received communication route changing instruction.

Upon receiving communication abnormality information from the rule deciding unit 44, for example, the AODV control unit 45 outputs to the communicating unit 110 a communication route changing instruction indicating the wireless terminal device 202H to broadcast route search information destined for the subordinate station 112 or the wireless terminal device 202G. The communication route changing instruction includes the IP address of the subordinate station 112 or the wireless terminal device 202G, for example.

Upon receiving the communication route changing instruction from the AODV control unit 45, for example, the communicating unit 110 transmits the received communication route changing instruction to the wireless terminal device 202H via the network 301A.

Upon receiving a communication route changing instruction from the master station 111, for example, the AODV processing unit 26 in the wireless terminal device 202H broadcasts a RREQ message including the IP address of the subordinate station 112 or the wireless terminal device 202G as a destination IP address, based on the received communication route changing instruction.

[Configuration of Subordinate Station]

Figure 22:
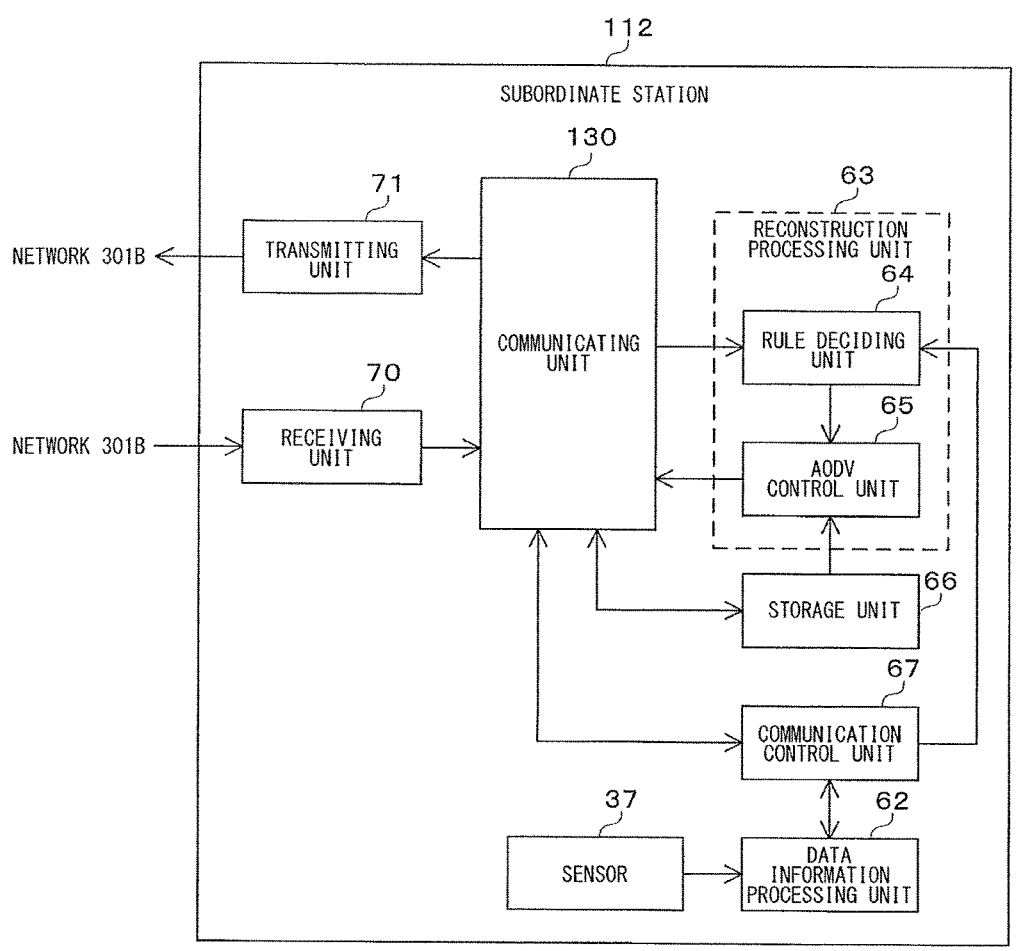
FIG. 22 is a diagram illustrating a configuration of a subordinate station in a wireless communication system according to the second embodiment of the present invention.

FIG. 22 is a diagram illustrating a configuration of a subordinate station in a wireless communication system according to the second embodiment of the present invention.

Referring to FIG. 22, as compared with the subordinate station 102 according to the first embodiment, the subordinate station 112 includes a communicating unit 130, a receiving unit 70, and a transmitting unit 71 in place of the communicating unit 30, the wireless receiving unit 60, and the wireless transmitting unit 61.

The receiving unit 70 receives an optical signal from the network 301B, converts the received optical signal into an electrical signal, and outputs the electrical signal to the communicating unit 130, for example.

The transmitting unit 71 converts the electrical signal and the like received from the communicating unit 130 into an optical signal, for example, and transmits the optical signal to the network 301B.

The communicating unit 130 communicates with the master station 111 via the network 301B, the wireless terminal device 202, and the network 301A, for example. Further, the communicating unit 130 acquires a communication route between the own subordinate station 112 and the master station 111, and makes the storage unit 66 store the acquired communication route.

In the storage unit 66, for example, there are recorded in advance the IP address of the wireless terminal device 202H that relays information to be exchanged between the wireless ad hoc network and the network 301A, and the IP address of the wireless terminal device 202G that relays information to be exchanged between the wireless ad hoc network and the network 301B.

Upon receiving communication abnormality information from the rule deciding unit 64, the AODV control unit 65 in the reconstruction processing unit 63 performs a process of changing the communication route, for example. Specifically, upon receiving communication abnormality information from the rule deciding unit 64, for example, the AODV control unit 65 requests the master station 111 or the wireless terminal device 202H to change the communication route. More specifically, the AODV control unit 65 acquires from the storage unit 66 the IP address of the master station 111 or the wireless terminal device 202H as a destination IP address of the RREQ message, for example.

The AODV control unit 65 outputs to the AODV processing unit 36 in the communicating unit 130 illustrated in FIG. 20 a communication route changing instruction indicating to broadcast the route search information destined for the master station 111 or the wireless terminal device 202H, for example. The communication route changing instruction includes the IP address of the master station 111 or the wireless terminal device 202H, for example.

Upon receiving a communication route changing instruction from the AODV control unit 65, for example, the AODV processing unit 36 broadcasts a RREQ message including the IP address of the master station 111 or the wireless terminal device 202H as a destination IP address, based on the received communication route changing instruction.

Upon receiving communication abnormality information from the rule deciding unit 64, for example, the AODV control unit 65 outputs to the communicating unit 130 a communication route changing instruction indicating the wireless terminal device 202G to broadcast route search information destined for the master station 111 or the wireless terminal device 202H. The communication route changing instruction includes the IP address of the master station 111 or the wireless terminal device 202H, for example.

Upon receiving the communication route changing instruction from the AODV control unit 65, for example, the communicating unit 130 transmits the received communication route changing instruction to the wireless terminal device 202G via the network 301B.

Upon receiving a communication route changing instruction from the subordinate station 112, for example, the AODV processing unit 26 in the wireless terminal device 202G broadcasts a RREQ message including the IP address of the master station 111 or the wireless terminal device 202H as a destination IP address, based on the received communication route changing instruction.

Because other configurations and operations are similar to those of the wireless communication system according to the first embodiment, a detailed description will not be repeated here.

As described above, in the master station 111 according to the second embodiment of the present invention, the communicating unit 110 can communicate with the subordinate station 112 using the communication route through the network 301A, one or a plurality of wireless terminal devices 202, and the network 301B, and communicates with the subordinate station 112 in accordance with the predetermined rule. When a state against the predetermined rule occurs, the reconstruction processing unit 43 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the master station 111, the time taken from the occurrence of the abnormality in the communication route to when the master station 111 recognizes the abnormality can be shortened. Therefore, the period during which IP packets cannot be transmitted and received between the master station 111 and the subordinate station 112 can be shortened.

In the master station 111 according to the second embodiment of the present invention, the reconstruction processing unit 43 broadcasts the RREQ message as route search information destined for the subordinate station 112 or the wireless terminal device 202G for determining a new communication route.

By using such a configuration, even when the master station 111 does not understand a communication route to the subordinate station 112 or the wireless terminal device 202G, because the RREQ message is transmitted to the subordinate station 112 or the wireless terminal device 202G, the process to be performed by the master station 111 can be simplified.

Further, because the RREQ message is transmitted to the subordinate station 112 or the wireless terminal device 202G via a plurality of communication routes, the subordinate station 112 or the wireless terminal device 202G can select a proper communication route from the plurality of communication routes through which the received RREQ message passed.

Further, by the unicast transfer from the subordinate station 112 or the wireless terminal device 202G to the master station 111 of the RREP message as a response to the RREQ message corresponding to the communication route selected by the subordinate station 112 or the wireless terminal device 202G, a new communication route between the master station 111 and the subordinate station 112 can be established.

In the communication system according to the second embodiment of the present invention, the plurality of wireless terminal devices 202 can relay the communication. The master station 111 can communicate with the subordinate station 112 using the communication route through the network 301A or one or a plurality of wireless terminal devices 202 and the network 301B, and communicates with the subordinate station 112 in accordance with the predetermined rule. When a state against the predetermined rule occurs, the master station 111 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the master station 111, the time taken from the occurrence of the abnormality in the communication route to when the master station 111 recognizes the abnormality can be shortened. Therefore, the period during which IP packets cannot be transmitted and received between the master station 111 and the subordinate station 112 can be shortened.

Further, in the communication system according to the second embodiment of the present invention, the master station 111 decides whether to perform the process of changing the communication route, based on the arrival state of data information destined for the own master station 111 regularly transmitted from the subordinate station 112.

By using such a configuration, based on the arrival state of the data information, the occurrence of a state against the predetermined rule can be recognized easily and promptly. Therefore, whether to perform the process of changing the communication route can be decided efficiently.

Further, in the communication system according to the second embodiment of the present invention, upon detecting the occurrence of a state against the predetermined rule, the master station 111 requests the subordinate station 112 or the wireless terminal device 202G to change the communication route. Upon receiving a request from the master station 111, the subordinate station 112 or the wireless terminal device 202G determines a new communication route.

By using such a configuration, for example, even when the subordinate station 112 and the wireless terminal device 202G cannot detect the occurrence of a state against the predetermined rule, a necessity for changing the communication route between the master station 111 and the subordinate station 112 or the wireless terminal device 202G can be promptly detected and the change can be performed.

That is, in the communication between the master station 111 and the subordinate station 112 or the wireless terminal device 202G, when at least the master station 111 has a function of detecting the occurrence of a state against the predetermined rule, a necessity for changing the communication route between the master station 111 and the subordinate station 112 or the wireless terminal device 202G can be promptly detected and the change can be performed. That is, because the configuration of the subordinate station 112 and the wireless terminal device 202G can be simplified, a total cost of the communication system can be reduced.

Further, even when the subordinate station 112 or the wireless terminal device 202G cannot detect the occurrence of a state against the predetermined rule, for example, the subordinate station 112 or the wireless terminal device 202G can recognize the occurrence of a state against the predetermined rule by receiving a request from the master station 111, and accordingly, a necessary process can be performed.

In the communication system according to the second embodiment of the present invention, the master station 111 broadcasts the RREQ message as route search information destined for the subordinate station 112 or the wireless terminal device 202G for determining a new communication route. The subordinate station 112 or the wireless terminal device 202 determines a new communication route, based on the RREQ message received via one or a plurality of kinds of communication routes.

By using such a configuration, even when the master station 111 does not understand a communication route to the subordinate station 112 or the wireless terminal device 202G, because the RREQ message is transmitted to the subordinate station 112 or the wireless terminal device 202G, the process to be performed by the master station 111 can be simplified.

Further, because the RREQ message is transmitted to the subordinate station 112, the wireless terminal device 202G, or the wireless terminal device 202 having a communication route to the subordinate station 112 as the wireless terminal device 202 other than the wireless terminal device 202G via a plurality of communication routes, the subordinate station 112, the wireless terminal device 202G, or the wireless terminal device 202 having a communication route to the subordinate station 112 can select a proper communication route from the plurality of communication routes through which the received RREQ message passed.

Further, by the unicast transfer to the master station 111 from the subordinate station 112, the wireless terminal device 202G, or the wireless terminal device 202 having a communication route to the subordinate station 112 of the RREP message as a response to the RREQ message corresponding to the communication route selected by the subordinate station 112, the wireless terminal device 202G, or the wireless terminal device 202 having a communication route to the subordinate station 112, a new communication route between the master station 111 and the subordinate station 112 can be established.

Further, in the subordinate station 112 according to the second embodiment of the present invention, the communicating unit 130 can communicate with the master station 111 using the communication route via the network 301B, one or a plurality of wireless terminal devices 202, and the network 301A, and communicates with the master station 111 in accordance with a predetermined rule. When a state against the predetermined rule occurs, the reconstruction processing unit 63 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the subordinate station 112, the time taken from the occurrence of the abnormality in the communication route to when the subordinate station 112 recognizes the abnormality can be shortened. Therefore, the period during which IP packets cannot be transmitted and received between the subordinate station 112 and the master station 111 can be shortened.

In the subordinate station 112 according to the second embodiment of the present invention, the reconstruction processing unit 63 broadcasts the RREQ message as route search information destined for the master station 111 or the wireless terminal device 202H for determining a new communication route.

By using such a configuration, even when the subordinate station 112 does not understand a communication route to the master station 111 or the wireless terminal device 202H, because the RREQ message is transmitted to the master station 111 or the wireless terminal device 202H, the process to be performed by the subordinate station 112 can be simplified.

Further, because the RREQ message is transmitted to the master station 111 or the wireless terminal device 202H via a plurality of communication routes, the master station 111 or the wireless terminal device 202H can select a proper communication route from the plurality of communication routes through which the received RREQ message passed.

Further, by the unicast transfer from the master station 111 or the wireless terminal device 202H to the subordinate station 112 of the RREP message as a response to the RREQ message corresponding to the communication route selected by the master station 111 or the wireless terminal device 202H, a new communication route between the subordinate station 112 and the master station 111 can be established.

In the communication system according to the second embodiment of the present invention, the plurality of wireless terminal devices 202 can relay the communication. The subordinate station 112 can communicate with the master station 111 using the communication route through the network 301B, one or a plurality of wireless terminal devices 202, and the network 301A, and communicates with the master station 111 in accordance with a predetermined rule. When a state against the predetermined rule occurs, the subordinate station 112 performs a process of changing the communication route.

Because, by such a configuration, the abnormality of the communication route can be recognized at the timing of the occurrence of a state against the predetermined rule, a necessity for changing the communication route can be promptly detected and the change can be performed.

Accordingly, as compared with the configuration in which the wireless terminal device 202 that detects the occurrence of an abnormality notifies the abnormality to the subordinate station 112, the time taken from the occurrence of the abnormality in the communication route to when the subordinate station 112 recognizes the abnormality can be shortened. Therefore, the period during which IP packets cannot be transmitted and received between the subordinate station 112 and the master station 111 can be shortened.

Further, in the communication system according to the second embodiment of the present invention, the subordinate station 112 decides whether to perform the process of changing the communication route, based on the arrival state of ACK destined for the own subordinate station 112 regularly transmitted from the master station 111.

By using such a configuration, based on the arrival state of the ACK, the occurrence of a state against the predetermined rule can be recognized easily and promptly. Therefore, whether to perform the process of changing the communication route can be decided efficiently.

Further, in the communication system according to the second embodiment of the present invention, upon detecting the occurrence of a state against the predetermined rule, the subordinate station 112 requests the master station 111 or the wireless terminal device 202H to change the communication route. Upon receiving a request from the subordinate station 112, the master station 111 or the wireless terminal device 202H determines a new communication route.

By using such a configuration, even when the master station 111 and the wireless terminal device 202H cannot detect the occurrence of a state against the predetermined rule, for example, a necessity for changing the communication route between the subordinate station 112 and the master station 111 or the wireless terminal device 202H can be promptly detected and the change can be performed.

That is, in the communication between the subordinate station 112 and the master station 111 or the wireless terminal device 202H, when at least the subordinate station 112 has a function of detecting the occurrence of a state against the predetermined rule, a necessity for changing the communication route between the subordinate station 112 and the master station 111 or the wireless terminal device 202H can be promptly detected and the change can be performed. That is, because the configuration of the master station 111 and the wireless terminal device 202H can be simplified, a total cost of the communication system can be reduced.

Further, even when the master station 111 or the wireless terminal device 202H cannot detect the occurrence of the state against a predetermined rule, for example, the master station 111 or the wireless terminal device 202H can recognize the occurrence of a state against the predetermined rule by receiving a request from the subordinate station 112, and accordingly, a necessary process can be performed.

In the communication system according to the second embodiment of the present invention, the subordinate station 112 broadcasts the RREQ message as route search information destined for the master station 111 or the wireless terminal device 202H for determining a new communication route. The master station 111 or the wireless terminal device 202 determines a new communication route, based on the RREQ message received via one or a plurality of kinds of communication routes.

By using such a configuration, even when the subordinate station 112 does not understand a communication route to the master station 111 or the wireless terminal device 202H, because the RREQ message is transmitted to the master station 111 or the wireless terminal device 202H, the process to be performed by the subordinate station 112 can be simplified.

Further, because the RREQ message is transmitted to the master station 111, the wireless terminal device 202H, or the wireless terminal device 202 having a communication route to the master station 111 as the wireless terminal device 202 other than the wireless terminal device 202H via a plurality of communication routes, the master station 111, the wireless terminal device 202H, or the wireless terminal device 202 having a communication route to the master station 111 can select a proper communication route from the plurality of communication routes through which the received RREQ message passed.

Further, by the unicast transfer to the subordinate station 112 from the master station 111, the wireless terminal device 202H, or the wireless terminal device 202 having a communication route to the master station 111 of the RREP message as a response to the RREQ message corresponding to the communication route selected by the master station 111, the wireless terminal device 202H, or the wireless terminal device 202 having a communication route to the master station 111, a new communication route between the master station 111 and the subordinate station 112 can be established.

In the wireless communication system 403 according to the second embodiment of the present invention, although the master station 111 and the subordinate station 112 are respectively configured to be communication-connected to the wireless terminal device 202 via the networks 301A and 301B, the configurations are not limited to these. In the wireless communication system 403, at least one of the master station 111 and the subordinate station 112 may be configured to be communication-connected to the wireless terminal device 202 without via the network 301.

The above embodiments are exemplifications in all aspects, and should not be considered as restrictive. A range of the present invention is indicated in claims and not in the above description, and is intended to include all changes in the equivalent meaning and the range of the claims.

REFERENCE SIGNS LIST 10, 20, 30, 110, 130: COMMUNICATING UNIT
11, 21, 31: APPLICATION
12, 22, 32: TCP PROCESSING UNIT
13, 23, 33 IP PROCESSING UNIT
14, 24, 34: WIFI MAC PROCESSING UNIT
15, 25, 35: WIFI PHY PROCESSING UNIT
16, 26, 36: AODV PROCESSING UNIT
17: DATABASE
37: SENSOR
40, 60: WIRELESS RECEIVING UNIT
41, 61: WIRELESS TRANSMITTING UNIT
42: DATA INFORMATION ACQUIRING UNIT
43, 63: RECONSTRUCTION PROCESSING UNIT
44, 64: RULE DECIDING UNIT
45, 65: AODV CONTROL UNIT
46, 66: STORAGE UNIT
47, 67: COMMUNICATION CONTROL UNIT
50, 70: RECEIVING UNIT
51, 71: TRANSMITTING UNIT
62: DATA INFORMATION PROCESSING UNIT
101, 111: MASTER STATION (COMMUNICATION DEVICE)
102, 112: SUBORDINATE STATION (COMMUNICATION DEVICE)
114, 134: ETHER MAC PROCESSING UNIT
115, 135: ETHER PHY PROCESSING UNIT
202: WIRELESS TERMINAL DEVICE
301: NETWORK
401, 402, 403: WIRELESS COMMUNICATION SYSTEM

The invention claimed is:
1. A communication device comprising:
a communicating unit that can communicate with another communication device by using a communication route through one or a plurality of wireless terminal devices, and that communicates with the another communication device in accordance with a predetermined rule;
a reconstruction processing unit that performs a process of changing the communication route when a state against the predetermined rule occurs; and
a control unit configured to control a sensor of the another communication device, wherein
the another communication device regularly transmits a communication signal including data information on the sensor to the communication device, the data information being used by the control unit,
the predetermined rule is a rule concerning an arrival state of the communication signal destined for the communication device regularly transmitted from the another communication device, and
the reconstruction processing unit decides whether the arrival state of the communication signal destined for the communication device regularly transmitted from the another communication device is against the predetermined rule, and performs the process of changing the communication route when the reconstruction processing unit decides the arrival state is against the predetermined rule.

2. The communication device according to claim 1, wherein the reconstruction processing unit broadcasts route search information destined for the another communication device or a wireless terminal device for determining a new communication route.

3. The communication device according to claim 1, wherein the communication device further comprises:
a storage unit that stores a plurality of kinds of the communication routes,
when a state against the predetermined rule occurs, the reconstruction processing unit selects a new communication route from among a plurality of kinds of the communication routes stored in the storage unit, and
the communicating unit communicates with the another communication device by using the communication route selected by the reconstruction processing unit.

4. The communication device according to claim 1, wherein the communication device operates in accordance with a protocol having a plurality of layers,
the communicating unit communicates by performing a process for a first layer out of the plurality of layers, and
the reconstruction processing unit performs a process of changing the communication route by performing a process for a second layer of a higher order than the first layer out of the plurality of layers.

5. A communication system comprising:
a plurality of wireless terminal devices capable of relaying communication; and
a communication device that can communicate with another communication device by using a communication route through one or a plurality of the wireless terminal devices, and that communicates with the another communication device in accordance with a predetermined rule, wherein
when a state against the predetermined rule occurs, the communication device performs a process of changing the communication route, and controls a sensor of the another communication device,
the another communication device regularly transmits a communication signal including data information on the sensor to the communication device, the data information being used by the communication device to control the sensor,
the predetermined rule is a rule concerning an arrival state of the communication signal destined for the communication device regularly transmitted from the another communication device, and
the communication device decides whether the arrival state of the communication signal destined for the communication device regularly transmitted from the another communication device is against the predetermined rule, and performs the process of changing the communication route when the reconstruction processing unit decides the arrival state is against the predetermined rule.

6. The communication system according to claim 5, wherein, upon detecting an occurrence of a state against the predetermined rule, the communication device requests the another communication device or the wireless terminal device to change the communication route, and
the another communication device or the wireless terminal device determines a new communication route upon receiving a request from the communication device.

7. The communication system according to claim 6, wherein the communication device broadcasts route search information destined for the another communication device or the wireless terminal device for determining a new communication route, and
the another communication device or the wireless terminal device determines the new communication route, based on the route search information received via one or a plurality of kinds of the communication routes.

8. A communication control method in a communication system comprising a plurality of wireless terminal devices capable of relaying communication, and a communication device capable of communicating with another communication device by using a communication route through one or a plurality of the wireless terminal devices, wherein
the communication device controls a sensor of the another communication device, and
the another communication device regularly transmits a communication signal including data information on the sensor to the communication device, the data information being used by the communication device to control the sensor, wherein
the communication control method comprises
a step for the communication device to communicate with the another communication device in accordance with a predetermined rule, and
a step for the communication device to perform a process of changing the communication route when a state against the predetermined rule occurs, wherein
the predetermined rule is a rule concerning an arrival state of the communication signal destined for the communication device regularly transmitted from the another communication device, and
in the step of performing a process of changing the communication route, the communication device decides whether the arrival state of the communication signal destined for the communication device regularly transmitted from the another communication device is against the predetermined rule, and performs the process of changing the communication route when the reconstruction processing unit decides the arrival state is against the predetermined rule.

9. A communication control program stored in a non-transitory computer readable storage medium, the communication control program being used in the communication device according to claim 1 capable of communicating with another communication device by using a communication route through one or a plurality of wireless terminal devices, wherein
the communication device controls a sensor of the another communication device, and
the another communication device regularly transmits a communication signal including data information on the sensor to the communication device, the data information being used by the communication device to control the sensor, and
the communication control program makes a computer execute
a step of communicating with the another communication device in accordance with a predetermined rule, and
a step of performing a process of changing the communication route when a state against the predetermined rule occurs, wherein
the predetermined rule is a rule concerning an arrival state of the communication signal destined for the communication device regularly transmitted from the another communication device, and
in the step of performing a process of changing the communication route, the communication device decides whether the arrival state of the communication signal destined for the communication device regularly transmitted from the another communication device is against the predetermined rule, and performs the process of changing the communication route when the reconstruction processing unit decides the arrival state is against the predetermined rule.

* * * * *